United States Patent
Park et al.

(10) Patent No.: US 11,663,081 B2
(45) Date of Patent: May 30, 2023

(54) STORAGE SYSTEM AND METHOD FOR DATA RECOVERY AFTER DETECTION OF AN UNCORRECTABLE ERROR

(71) Applicant: Western Digital Technologies, Inc., San Jose, CA (US)

(72) Inventors: Seungbae Park, Yongin-si (KR); Minyoung Kim, Gyeonggi-do (KR); Minwoo Lee, Hwaseong-si (KR); Namjung Hwang, Bucheon-si (KR)

(73) Assignee: Western Digital Technologies, Inc., San Jose, CA (US)

(*) Notice: Subject to any disclaimer, the term of this patent is extended or adjusted under 35 U.S.C. 154(b) by 123 days.

(21) Appl. No.: 17/316,189

(22) Filed: May 10, 2021

(65) Prior Publication Data
US 2022/0358016 A1 Nov. 10, 2022

(51) Int. Cl.
*G06F 11/14* (2006.01)
*G06F 12/10* (2016.01)

(52) U.S. Cl.
CPC .......... *G06F 11/1415* (2013.01); *G06F 12/10* (2013.01); *G06F 2201/85* (2013.01)

(58) Field of Classification Search
CPC ... G06F 11/1415; G06F 12/10; G06F 2201/85
USPC .......................................................... 714/747
See application file for complete search history.

(56) References Cited

U.S. PATENT DOCUMENTS

| | | | |
|---|---|---|---|
| 2009/0103364 A1* | 4/2009 | Pekny | G06F 12/0804 365/185.17 |
| 2014/0026013 A1* | 1/2014 | Koseki | G06F 11/1008 714/764 |
| 2016/0188429 A1* | 6/2016 | Noguchi | G06F 11/1068 714/6.21 |

* cited by examiner

*Primary Examiner* — James C Kerveros
(74) *Attorney, Agent, or Firm* — Crowell & Moring LLP

(57) ABSTRACT

A storage system caches, in volatile memory, data read from non-volatile memory. After detecting an uncorrectable error in the data cached in the volatile memory, the storage system replaces the cached data with data re-read from the non-volatile memory and updated to reflect any changes made to the data after it was stored in the non-volatile memory. The storage system can also analyze a pattern in data adjacent to the uncorrectable error and predict corrected data based on the pattern.

20 Claims, 27 Drawing Sheets

| | 0 | 1 | 2 | 3 | 4 | 5 | 6 | 7 | 8 | 9 | a | b | c | d | e | f |
|---|---|---|---|---|---|---|---|---|---|---|---|---|---|---|---|---|
| 00000000h: | 69 | 08 | BC | 16 | 6A | 08 | BC | 16 | 6B | 08 | BC | 16 | 6C | 08 | BC | 16 |
| 00000010h: | 6D | 08 | BC | 16 | 6E | 08 | BC | 16 | 6F | 08 | BC | 16 | 70 | 08 | BC | 16 |
| 00000020h: | [61] | 08 | BC | 16 | 72 | 08 | BC | 16 | 73 | 08 | BC | 16 | 74 | 08 | BC | 16 |
| 00000030h: | 75 | 08 | BC | 16 | 76 | 08 | BC | 16 | 77 | 08 | BC | 16 | 78 | 08 | BC | 16 |
| 00000040h: | 79 | 08 | BC | 16 | 7A | 08 | BC | 16 | 7B | 08 | BC | 16 | [74] | 08 | BC | 16 |
| 00000050h: | 7D | 08 | BC | 16 | 7E | 08 | BC | 16 | 7F | 08 | BC | 16 | 80 | 08 | BC | 16 |
| 00000060h: | 81 | 08 | BC | 16 | 82 | 08 | BC | 16 | 83 | 08 | BC | 16 | 84 | 08 | BC | 16 |
| 00000070h: | 85 | 08 | BC | 16 | 86 | 08 | BC | 16 | 87 | 08 | BC | 16 | 88 | 08 | BC | 16 |

General linear FTL mapping pattern

FIG. 14

|           | 0  | 1  | 2  | 3  | 4  | 5  | 6  | 7  | 8  | 9  | a  | b  | c  | d  | e  | f  |
|-----------|----|----|----|----|----|----|----|----|----|----|----|----|----|----|----|----|
| 00000000h:| FF | FF | FF | FF | FF | FF | FF | FF | FF | FF | FF | FF | FF | FF | FF | FF |
| 00000010h:| FF | FF | FF | FF | F7 | FF | FF | FF | FF | FF | FF | FF | FF | FF | FF | FF |
| 00000020h:| FF | FF | FF | FF | EF | FF | FF | FF | FF | FF | FF | FF | FF | FF | FF | FF |
| 00000030h:| FF | FF | FF | FF | FF | FF | FF | FF | FF | FF | FF | FF | FF | FF | FF | FF |
| 00000040h:| FF | FF | FF | FF | FF | FF | FF | FF | FF | FF | FF | FF | FF | FF | FF | FF |
| 00000050h:| FF | FF | FF | FF | FF | FF | FF | FF | FF | FF | FF | FF | FF | FF | FF | FF |
| 00000060h:| FF | FF | FF | FF | FF | FF | FF | FF | FF | FF | FF | FF | FF | FF | FF | FF |
| 00000070h:| FF | FF | FF | FF | FF | FF | FF | FF | FF | FF | FF | FF | FF | FF | FF | FF |

Initial FTL mapping pattern

FIG. 15

|  | 0 | 1 | 2 | 3 | 4 | 5 | 6 | 7 | 8 | 9 | a | b | c | d | e | f |
|---|---|---|---|---|---|---|---|---|---|---|---|---|---|---|---|---|
| 00000000h: | 01 | FD | 04 | 16 | 02 | FD | 04 | 16 | 03 | F9 | 04 | 16 | 04 | FD | 04 | 16 |
| 00000010h: | 14 | FD | 04 | 16 | 15 | FD | 04 | 16 | 16 | FD | 04 | 16 | 17 | FD | 04 | 16 |
| 00000020h: | 18 | FD | 04 | 16 | 19 | FD | 04 | 16 | 1A | FD | 04 | 16 | 1B | FD | 04 | 16 |
| 00000030h: | 1C | FD | 04 | 16 | 1D | FD | 04 | 16 | 1E | FD | 04 | 16 | 1F | FD | 04 | 16 |
| 00000040h: | 20 | FD | 04 | 16 | 21 | FD | 04 | 16 | 22 | FD | 04 | 16 | 23 | FD | 04 | 16 |
| 00000050h: | 24 | FD | 04 | 16 | 25 | FD | 04 | 16 | 26 | F5 | 04 | 16 | 27 | FD | 04 | 16 |
| 00000060h: | 28 | FD | 04 | 16 | 29 | FD | 04 | 16 | 2A | FD | 04 | 16 | 2B | FD | 04 | 16 |
| 00000070h: | 2C | FD | 04 | 16 | 2D | FD | 04 | 16 | 2E | FD | 04 | 16 | 2F | FD | 04 | 16 |

Multi linear FTL mapping pattern

FIG. 16

|            | 0  | 1  | 2  | 3  | 4  | 5  | 6  | 7  | 8  | 9  | a  | b  | c  | d  | e  | f  |
|------------|----|----|----|----|----|----|----|----|----|----|----|----|----|----|----|----|
| 0x3EB600   |    |    |    |    |    |    |    |    |    |    |    |    |    |    |    |    |
| 00000000h: | 69 | 08 | BC | 16 | 6A | 08 | BC | 16 | 6B | 08 | BC | 16 | 6C | 08 | BC | 16 |
| 00000010h: | 6D | 08 | BC | 16 | 6E | 08 | BC | 16 | 6F | 08 | BC | 16 | 70 | 08 | BC | 16 |
| 00000020h: | [61] | 08 | BC | 16 | 72 | 08 | BC | 16 | 73 | 08 | BC | 16 | 74 | 08 | BC | 16 |
| 00000030h: | 75 | 08 | BC | 16 | 76 | 08 | BC | 16 | 77 | 08 | BC | 16 | 78 | 08 | BC | 16 |
| 00000040h: | 79 | 08 | BC | 16 | 7A | 08 | BC | 16 | 7B | 08 | BC | 16 | [74] | 08 | BC | 16 |
| 00000050h: | 7D | 08 | BC | 16 | 7E | 08 | BC | 16 | 7F | 08 | BC | 16 | 80 | 08 | BC | 16 |
| 00000060h: | 81 | 08 | BC | 16 | 82 | 08 | BC | 16 | 83 | 08 | BC | 16 | 84 | 08 | BC | 16 |
| 00000070h: | 85 | 08 | BC | 16 | 86 | 08 | BC | 16 | 87 | 08 | BC | 16 | 88 | 08 | BC | 16 |

FIG. 17

| Case | Corrupt -1 Pos | Corrupt Pos | Corrupt +1 Pos |
|---|---|---|---|
| #1 | 0x16BC0870 | 0x16BC0861 → 0x16BC0871 (Correct) | 0x16BC0872 |
| #2 | 0x16BC087B | 0x16BC0874 → 0x16BC087C (Correct) | 0x16BC087D |

FIG. 18

STORAGE SYSTEM AND METHOD FOR DATA RECOVERY AFTER DETECTION OF AN UNCORRECTABLE ERROR

BACKGROUND

When a host writes to and reads from a non-volatile memory in a storage system, mapping data in the non-volatile memory or in a volatile memory is updated by a write operation and is loaded by a read operation from the non-volatile memory to the volatile memory if the required mapping data is not yet loaded from the non-volatile memory. As protection of the mapping data in the volatile memory, error correction code (ECC) parity bits can be generated and stored together in the volatile memory. For example, during a read operation, mapping data can be read from the volatile memory to find the physical location in the non-volatile memory. When reading the mapping data from the volatile memory, its associated ECC parity bits can be used to determine if there is an error in the mapping data. Depending on the ECC technique used and how many data bits are in error, the controller may be able to merely detect that there is an error in the data or, in some situations, may be able to correct the error.

BRIEF DESCRIPTION OF THE DRAWINGS

FIG. 14 is an illustration of a general linear FTL mapping pattern of an embodiment.

FIG. 15 is an illustration of an initial FTL mapping pattern of an embodiment.

FIG. 16 is an illustration of a multi-linear FTL mapping pattern of an embodiment.

FIG. 17 is an illustration of a multi-bit error incidence of general linear FTL mapping of an embodiment on a 128 byte read.

FIG. 18 is an illustration of an FTL mapping pattern of an embodiment that is adjacent to a corrupt position.

DETAILED DESCRIPTION

The following embodiments are generally related to a storage system and method for data recovery after detection of an uncorrectable error. In general, the storage system of these embodiments can be used to analyze an error pattern and try to recover data by prediction, if applicable, and validate the recovered data by read back. If an unpredictable error occurs or if there is a failure to validate, a recover operation can be used to rebuild the mapping data.

In one embodiment, a storage system is provided comprising a non-volatile memory and a controller coupled to the memory. The controller is configured to cache data read from the non-volatile memory in a first volatile memory; store an update to the data in a second volatile memory; determine whether an uncorrectable error exists in the data cached in the first volatile memory; and in response to determining that the uncorrectable error exists in the data cached in the first volatile memory, replace the data cached in the first volatile memory with data re-read from the non-volatile memory and updated with the update stored in the second volatile memory. In another embodiment, a method is provided comprising detecting an uncorrectable multi-bit error in data read from the non-volatile memory and cached in a volatile memory; analyzing a pattern in data adjacent the uncorrectable multi-bit error; and predicting corrected data based on the pattern. In yet another embodiment, a storage system is provided comprising a non-volatile memory, means for storing data read from the non-volatile memory in a first volatile memory; means for storing an update to the data in a second volatile memory; and means for, in response to determining that an uncorrectable error exists in the data cached in the first volatile memory, replacing the data cached in the first volatile memory with data re-read from the non-volatile memory and updated with the update stored in the second volatile memory. Other embodiments are provided, and each of these embodiments can be used alone or in combination.

Figure 1A:
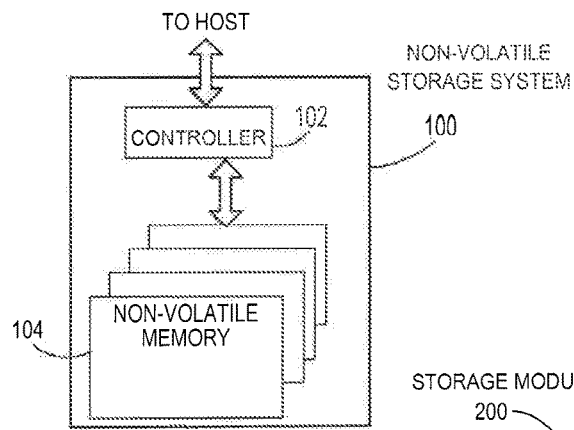
FIG. 1A is a block diagram of a non-volatile storage system of an embodiment.
Figure 1B:
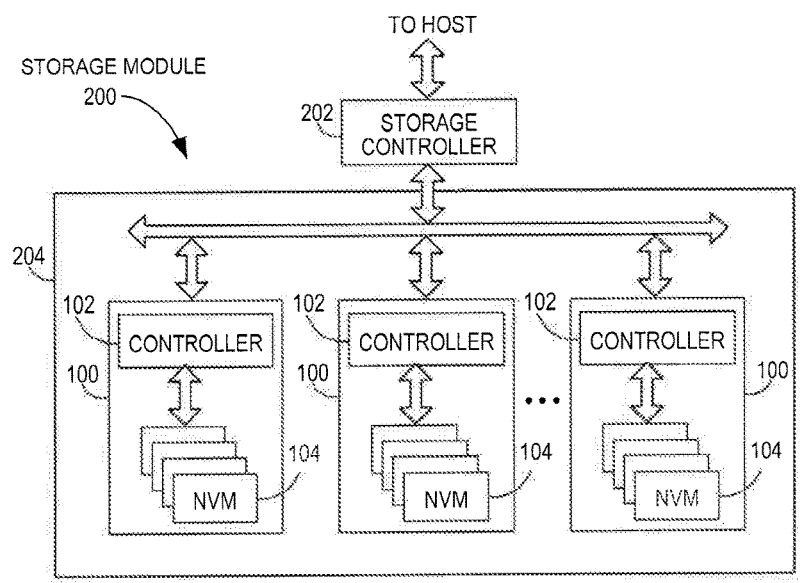
FIG. 1B is a block diagram illustrating a storage module of an embodiment.
Figure 1C:
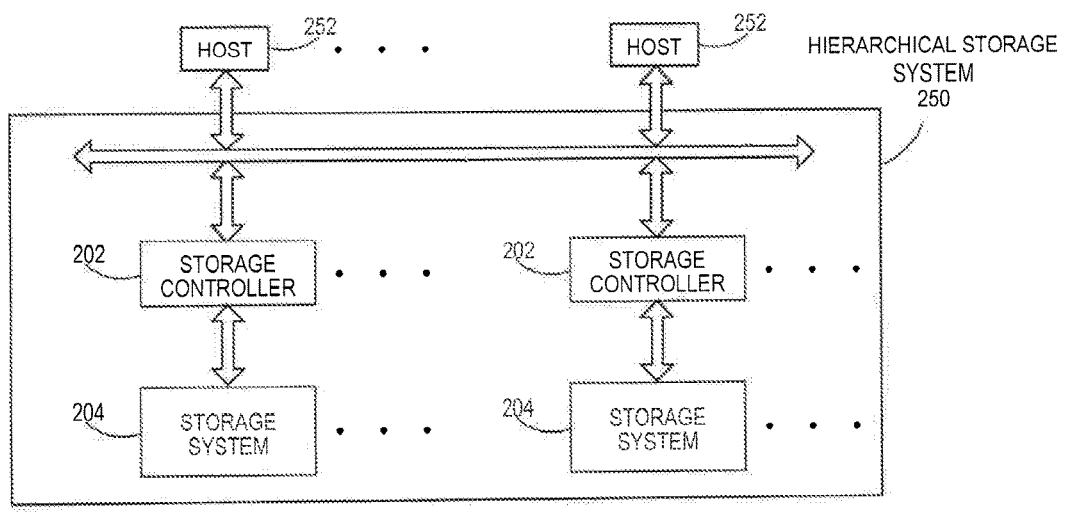
FIG. 1C is a block diagram illustrating a hierarchical storage system of an embodiment.

Turning now to the drawings, storage systems suitable for use in implementing aspects of these embodiments are shown in FIGS. 1A-1C. FIG. 1A is a block diagram illustrating a non-volatile storage system 100 (sometimes referred to herein as a storage device or just device) according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused). Also, the structure for the "means" recited in the claims can include, for example, some or all of the structures of the controller described herein, programmed or manufactured as appropriate to cause the controller to operate to perform the recited functions.

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
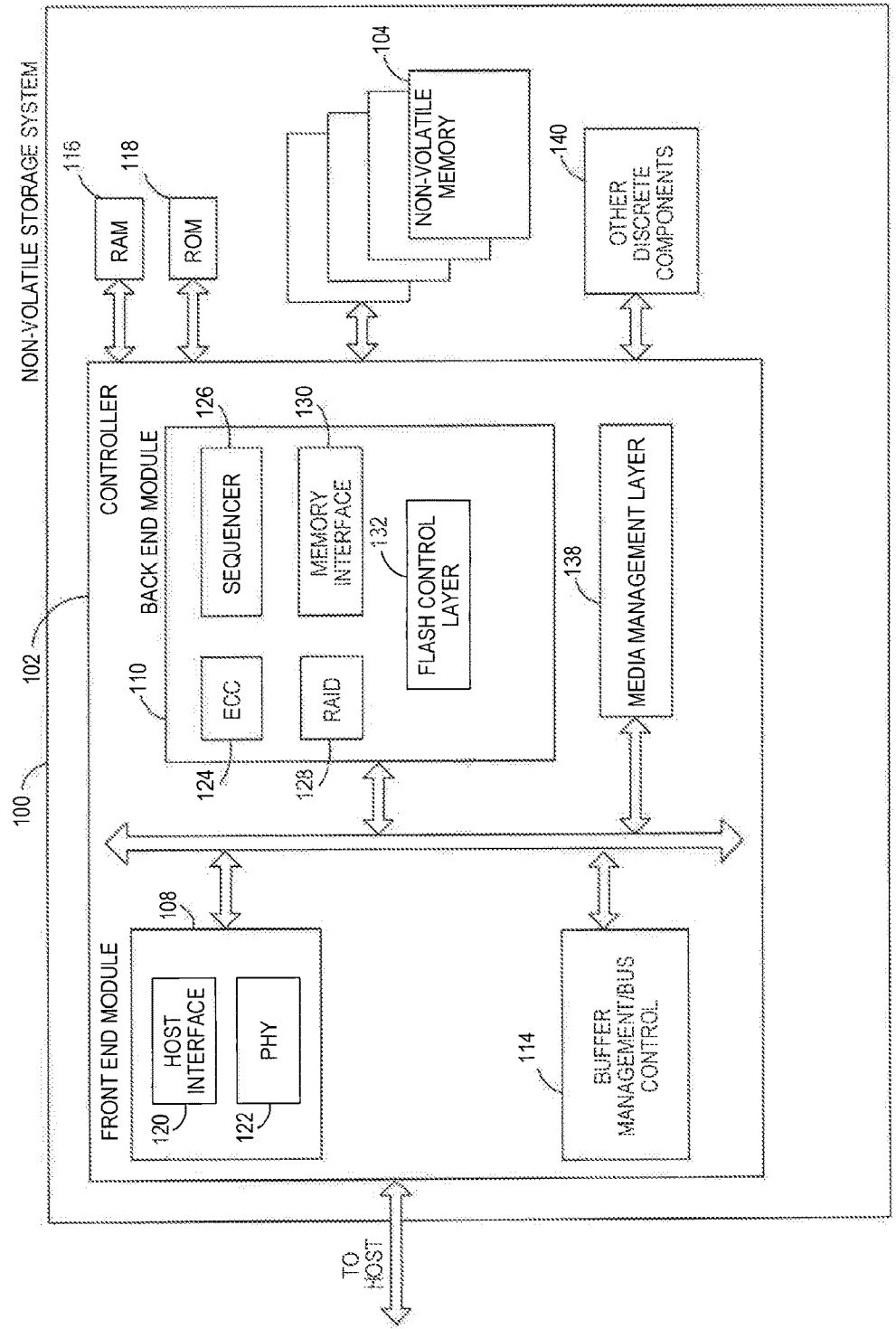
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. The controller 102 may sometimes be referred to herein as a NAND controller or a flash controller, but it should be understood that the controller 102 can be used with any suitable memory technology, example of some of which are provided below.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
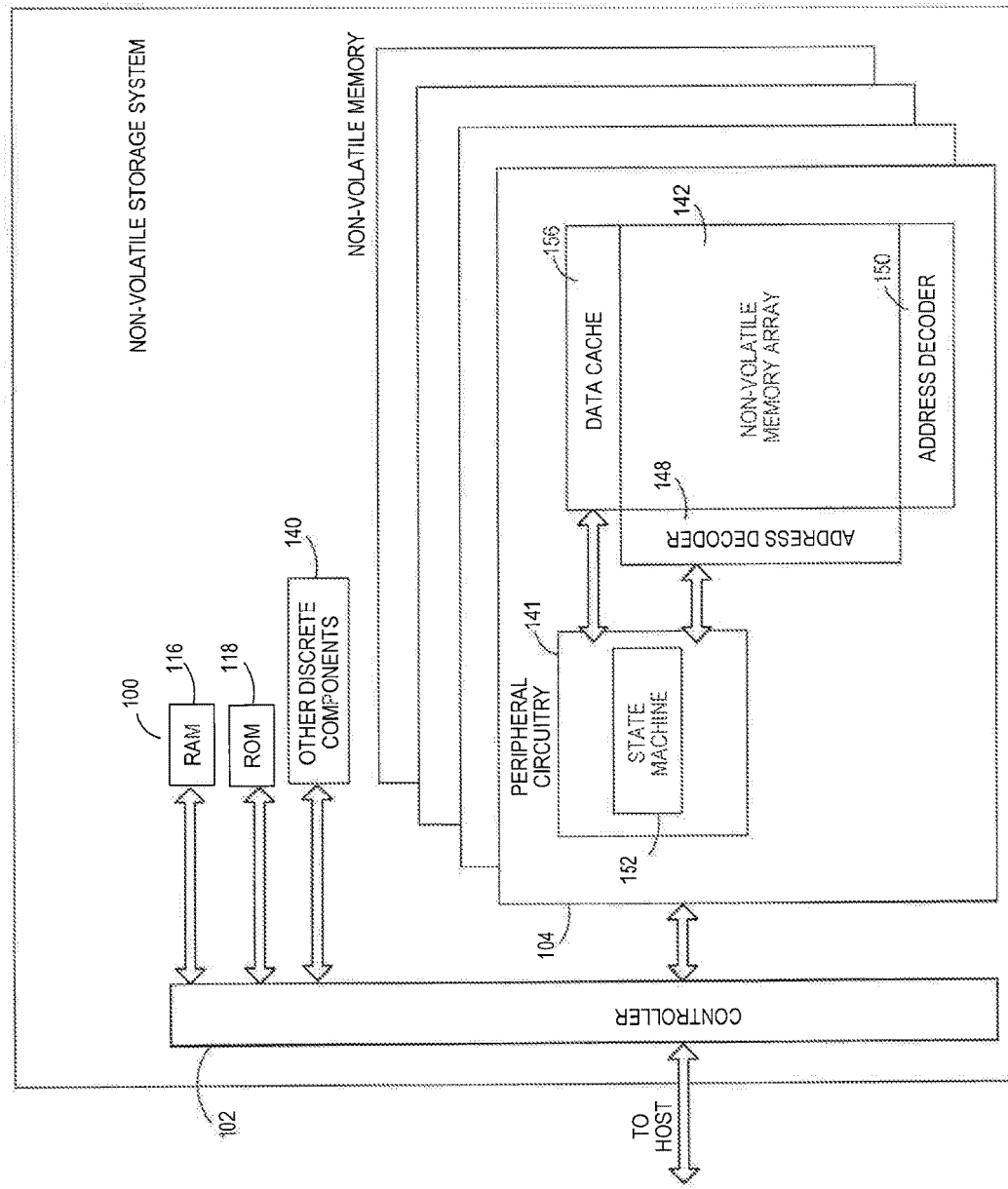
FIG. 2B is a block diagram illustrating components of the non-volatile storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
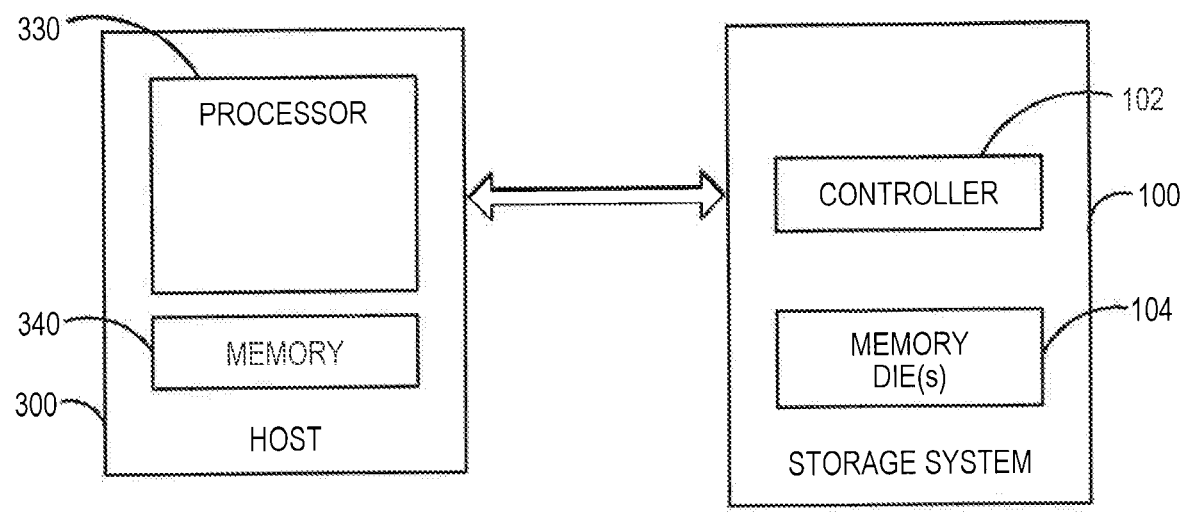
FIG. 3 is a diagram of a host and a storage system of an embodiment.

Turning again to the drawings, FIG. 3 is a block diagram of a host 300 and storage system (sometimes referred to herein as a device) 100 of an embodiment. The host 300 can take any suitable form, including, but not limited to, a computer, a mobile phone, a digital camera, a tablet, a wearable device, a digital video recorder, a surveillance system, etc. The host 300 comprises a processor 330 that is configured to send data (e.g., initially stored in the host's memory 340) to the storage system 100 for storage in the storage system's memory 104.

As discussed above, when a host writes to and reads from a non-volatile memory in a storage system, mapping data in the non-volatile memory or in a volatile memory is updated by a write operation and is loaded by a read operation from the non-volatile memory to the volatile memory if the required mapping data is not yet loaded from the non-volatile memory. As protection of the mapping data in the volatile memory, error correction code (ECC) parity bits can be generated and stored together in the volatile memory. For example, during a read operation, mapping data can be read from the volatile memory to find the physical location in the non-volatile memory. When reading the mapping data from the volatile memory, its associated ECC parity bits can be used to determine if there is an error in the mapping data. Depending on the ECC technique used and how many data bits are in error, the controller may be able to merely detect that there is an error in the data or, in some situations, may be able to correct the error.

For example, using the ECC parity bits, a controller in the storage system determines if there is an error (e.g., a bit flip from 0 to 1 or a bit flip from 1 to 0) in the data (e.g., caused by a malfunctioning memory cell or an error in reading the data from a memory cell). Depending on the ECC technique used, the controller (e.g., a double data rate (DDR) controller inside or outside of a DRAM module) may be able to merely detect that there is an error in the data (e.g., if there is a multi-bit error) or may be able to correct the error (e.g., if there is only a one-bit error).

One common error correcting code is the single error correction and double error detection (SECDED) code. In general, a code with distance k can detect, but not correct, k−1 errors. The correctable bit-flip is recovered by ECC on-the-fly, but, if any uncorrectable bit-flip is detected, no action can be taken other than terminating all operations and issuing an assert signal to warn the host that the storage system is in a critical state.

An error can occur in any form of data. For example, an error can occur when reading logical-to-physical address mapping data, sometimes referred to herein as flash translation layer (FTL) mapping data. The mapping data can be used to convert a logical block address (LBA) provided by the host 300 to a physical address of the non-volatile memory 104. Mapping data is typically read from the non-volatile memory 104 and cached in volatile memory, such as DRAM 116, to cover more mapping data. FTL mapping data is periodically stored in the non-volatile memory 104, and the latest FTL mapping data is kept in the DRAM 116.

Figure 4:
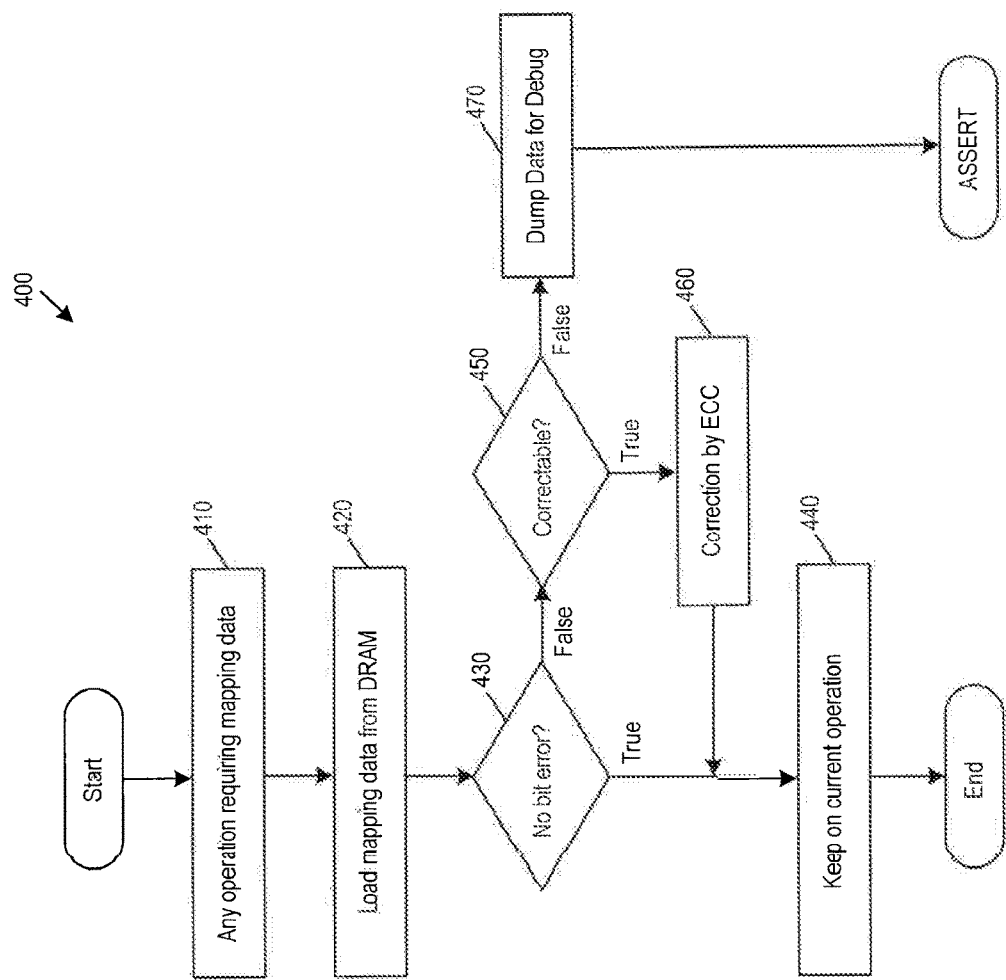
FIG. 4 is a flow chart of an error code correction operation of an embodiment.

FIG. 4 is a flow chart 400 of an error code correction operation of an embodiment when mapping data is read. As shown in FIG. 4, in this method, the controller 102 determines that there is an operation requiring mapping data (410) and loads mapping data from DRAM (420). The mapping data was previously read from the non-volatile memory 104 and placed in DRAM 116. Next, the controller 102 determines if there is a bit error in the mapping data stored in DRAM 116 (430). If no bit error is present, the controller 102 continues with the current operation (440). However, if a bit error is present, the controller 102 determines if the bit error is correctable (450). If the bit error is correctable, the controller 102 uses its ECC module 124 to make the correction (460). If the bit error is not correctable, the controller 102 dumps the data for debugging (470) and issues an assert signal to signify a malfunction.

It should be noted that while DRAM is used in these examples, any form of volatile memory can be used, as well as non-volatile memory. Also, in some embodiments, instead of storing mapping data in memory (e.g., DRAM) in the storage system 100, the mapping data is stored in memory 340 in the host 300. This memory 340, which can be volatile memory, is sometimes referred to herein as a host memory buffer (HMB) and can be used, for example, when the storage system 100 does not have DRAM or enough DRAM. For example, in DRAM-less storage systems, available memory resources are limited, and performance degradation can occur due to frequently loading mapping from the non-volatile memory 104. Using the HMB 340 in the host 300 can complement the memory in the storage system 100 as a second-chance cache to store mapping data loaded from the non-volatile memory 104. However, the host 300 may be able to disable the HMB 340 at any time. So, using the HMB 340 as a cache may be limited to read-only situations. Therefore, the mapping data in the HMB 340 should be invalidated whenever updated by a host write. In other words, the mapping data in the HMB 340 is always the last version of the mapping data copied from the non-volatile memory 104. As a result, if an uncorrectable error is detected while reading mapping data from the HMB 340, the mapping data can be recovered by reloading the mapping data from the non-volatile memory 104 because of the read-only usage of the mapping data in the HMB 340.

Figure 5:
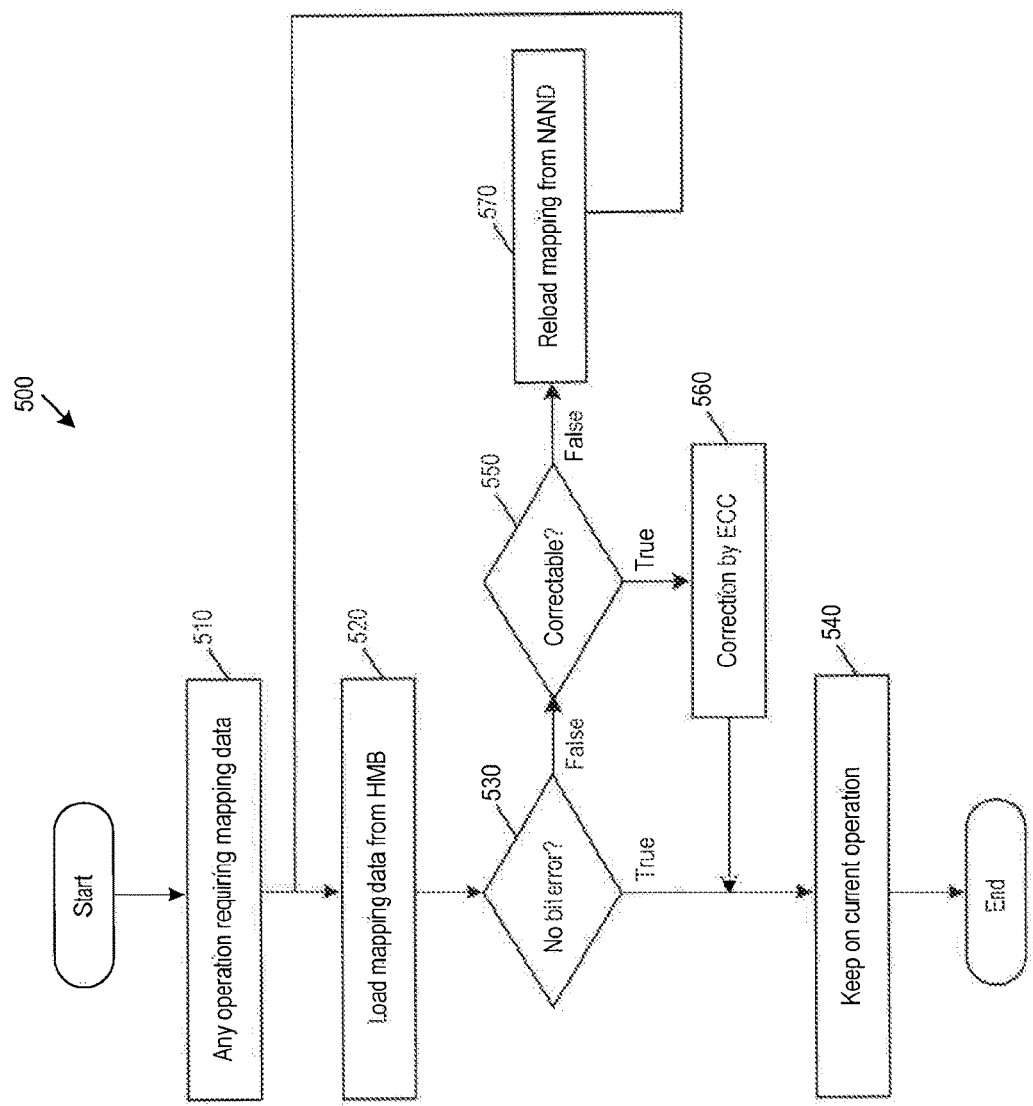
FIG. 5 is a flow chart of a bit-flip recovery operation of an embodiment.

FIG. 5 is a flow chart 500 that illustrates this recovery operation. As shown in FIG. 5, in this method, the controller 102 determines that there is an operation requiring mapping data (510) and loads the mapping data from the host memory buffer (HMB) 340 (520). Next, the controller 102 determines if there is a bit error in the mapping data (530). If no bit error is present, the controller 102 continues with the current operation (540). However, if there is a bit error, the controller 102 determines if the bit error is correctable (550). If the bit error is correctable, the controller 102 uses ECC parity bits to make the correction (560). If the bit error is not correctable, the controller 102 reloads the mapping data from the memory 104 (570).

In contrast to DRAM-less storage systems, a storage system 100 with DRAM 116 loads mapping data from the non-volatile memory 104 into the internal DRAM 116. The loaded mapping data in DRAM 116 can be updated in-place by a host write. If the recovery scheme using in the DRAM-less storage system is expanded to a DRAM-based storage system, the recovery operation may not work to recover a bit-flip error depending on the status of mapping resided in the DRAM 116. For example, if loaded mapping data in the DRAM 116 is updated after a host write and an uncorrectable error happens to the updated mapping data, the bit-flip error cannot be recovered by reloading the original mapping from the non-volatile memory 104, as that data is no longer valid. That is, the recovery scheme for the HMB situation discussed above is suitable in a read-only situation wherein the updating the mapping data is not possible.

Further, the recent trend of mapping management in the HMB 340 allows updating the mapping data. Thus, if a bit-flip error is raised when mapping-read and mapping-write are allowable in the HMB 340, the same problem issue would occur of not being able to recover the latest mapping data, which can result in a loss of user data. If there is uncorrectable error, the storage system may be deemed unusable or operating in a malfunction state. The following embodiments can be used for data recovery of an uncorrectable error.

In general, to recover an uncorrectable error, the controller 102 in the storage system 100 can reload and re-place the correct data in the DRAM 116 after merging previously-stored data in the non-volatile memory 104 with the data resided in SRAM/NAND. In this way, the controller 102 brings the latest data to the DRAM 116 by introducing a new corrupted data recovery method.

More specifically, if an uncorrectable DRAM bit-flip error is detected but the FTL mapping data stored in the non-volatile memory 104 is old, the saved mapping data should not be used for recovery purposes because it is too risky to return old data that can result in a data mis-compare or a system crash. Nevertheless, in these embodiments, the controller 102 can recover the latest FTL mapping data from old FTL mapping data and update the mapping scan. In other words, the controller 102 can be configured to recover the uncorrectable error by finding the proper source and reloading it to the DRAM 116. This type of recovery can apply to the future HMB use cases in new DRAM-less products that enable read-write mapping data in the HMB. Without the recovery of an uncorrected error in the DRAM 116, the error can lead either to a crash or to wrong data being provided to the host 300, which can result in the storage system 100 being deemed unusable. So, these embodiments can provide a more robust and reliable storage system that reduces the failure rate from production to qualification in the field.

Figure 6:
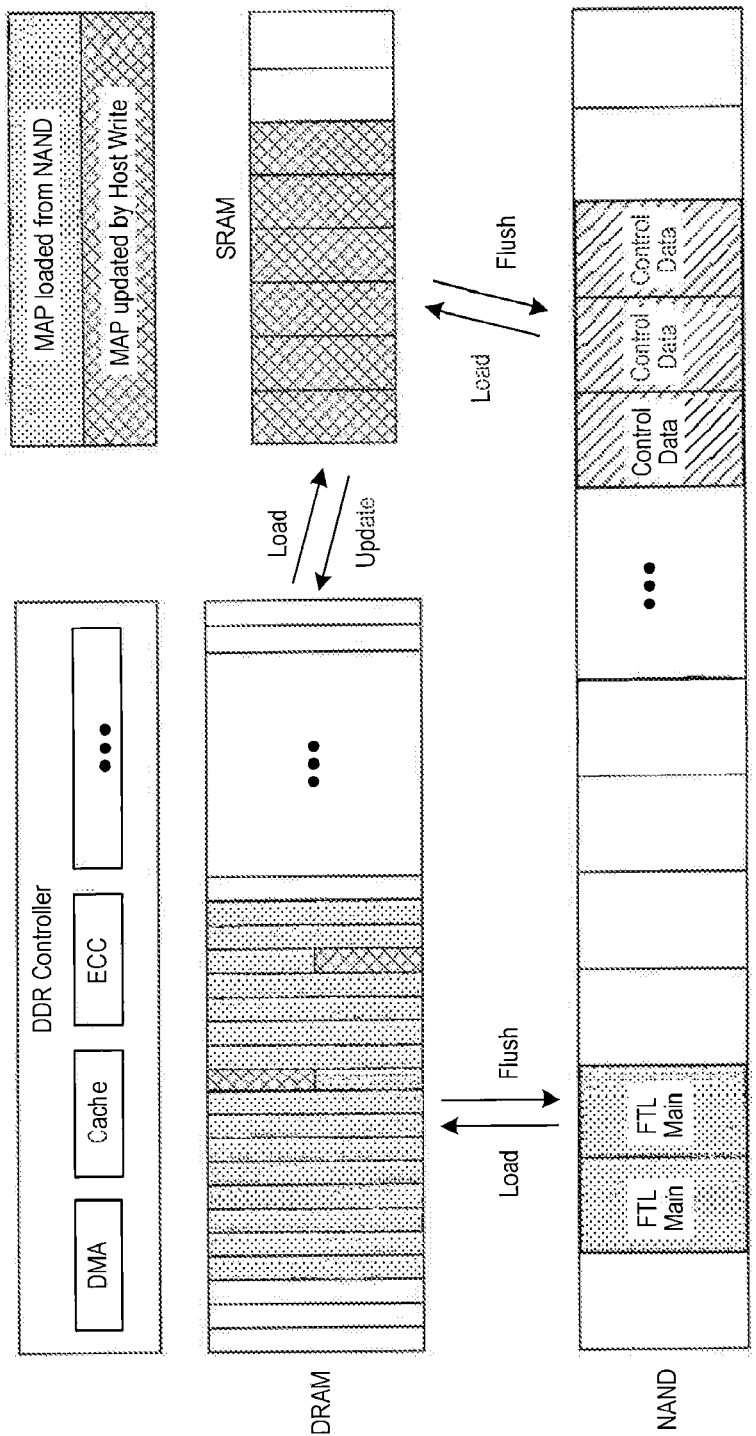
FIG. 6 is a diagram of a flash translation layer (FTL) mapping data management system of an embodiment.

Turning again to the drawings, FIG. 6 shows an example of DRAM usage as the cache for FTL mapping data in a storage system (e.g., solid state drive (SSD)) subsystem. As shown in FIG. 6, in this embodiment, the storage system comprises a controller (with a direct memory access (DMA) module, a cache, an ECC module, and potentially other modules), non-volatile memory (e.g., NAND), and first and second volatile memories (e.g., DRAM and SRAM). The FTL mapping data is generated by the controller during a host write and then saved for further access to the data written by the host 300. To prevent loss of the mapping data from sudden power off, there are main and temporary areas for mapping data in the non-volatile memory 104. The FTL main mapping block is updated by some events when the number of updated mapping data reaches a flush threshold. There is a control block that covers overall control data including the updated mapping data. The control block is also updated by various events, such that a user data block becomes full and closed. One of the main purposes of managing updated mapping data in the control block is to prevent mapping data loss from a sudden power off.

During an initialization process, some or all of the existing mapping data is loaded from FTL main block(s) in the non-volatile memory to the DRAM cache. When the host 300 sends a read command, the relevant mapping data is loaded from the DRAM to translate a logical address to a physical address, and the requested host data is returned. If the host 300 sends a write command pointing to an address written before, the mapping data in SRAM is updated, and the relevant DRAM data is also instantly updated. If the host 300 sends a write command pointing a new address, new mapping data is created in SRAM. The newly-created mapping data is reflected to DRAM 116 later by a merge operation that is the preparation to update the main mapping data. After the merge operation in DRAM 116, the main mapping data is flushed to the FTL main mapping block in the non-volatile memory.

As the interface with various external modules to access DRAM, the controller provides access to the DRAM by the DMA and cache modules. The DMA module is used to provide efficient transfer for large data from/to DRAM, and the cache module is used to hide the latency to access DRAM and reduce the penalty of partial updates within a same page. Based on the size of the FTL mapping data updated in each location, cache module can be used for transfers between DRAM and SRAM, and the DMA module can be used for transfers between DRAM and NAND.

ECC can be used to detect a DRAM bit-flip when DRAM is accessed for a read operation. In one embodiment, there are three cases in which FTL mapping data in DRAM is read based on the status of the required mapping data for recovery. These three cases are denoted as A, B, and C in FIG. 7.

Figure 7:
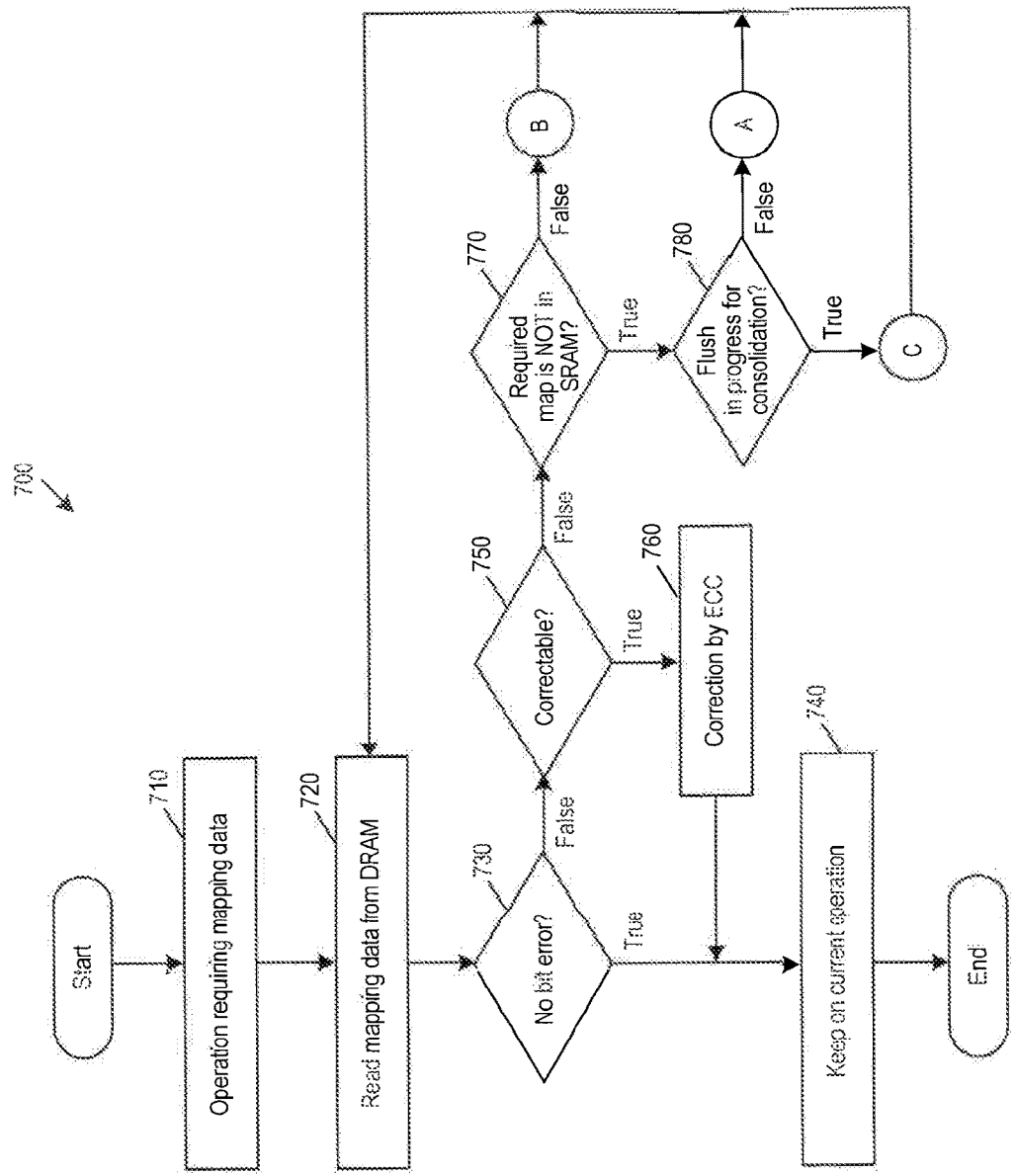
FIG. 7 is a flow chart of an FTL mapping data recovery operation of an embodiment.

FIG. 7 is a flow chart 700 of an FTL mapping data recovery operation of an embodiment. As shown in FIG. 7, in this method, the controller 102 determines that there is an operation requiring mapping data (710) and loads the mapping data from DRAM (720). Next, the controller 102 determines if there is a bit error in the mapping data (730). If no bit error is present, the controller 102 continues with the current operation (740). However, if there is a bit error, the controller 102 determines if the bit error is correctable (750). If the bit error is correctable, the controller 102 uses ECC to make the correction (760). If the bit error is not correctable, the controller 102 determines whether the required map is in SRAM (770).

Figure 8:
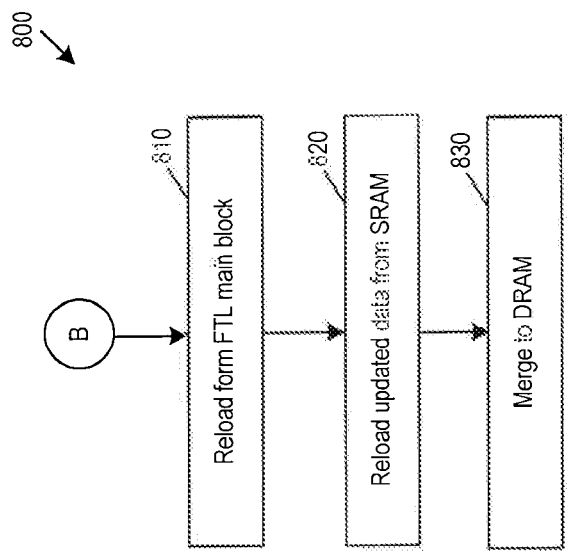
FIG. 8 is a flow chart of a method of an embodiment for rebuilding mapping data.

If the required map is in SRAM, case B occurs. In case B, there is recovery by rebuilding the mapping data from the FTL main block and SRAM. In one embodiment, the controller 102 rebuilds the mapping data, as illustrated in the flow chart 800 in FIG. 8. As shown in FIG. 8, the controller 102 reloads from the FTL main block (810), reloads updated data from the SRAM (820), and merges to the DRAM (830). So, case B considers that the required mapping data is in SRAM. An example of this case in FIG. 6 is that the required map is in the different shaded entries in DRAM. In this case, the updated mapping data was not flushed yet, so it is not available to recover just by reloading from FTL main block as in case A, which is described below. Instead, the mapping data should be rebuilt in DRAM by reloading from the FTL main block and SRAM.

If the required map is not in SRAM, the controller 102 determines if a flush is in progress for consolidation (780). If a flush is not in progress for consolidation, case A occurs, where the method loops back to 720. In case A, the mapping data can be recovered just by reloading from FTL main block. That is, to process the operations requiring mapping data, such as host read, the controller 102 can access the DRAM to get the mapping data. It is not guaranteed that the required mapping data can be found in SRAM due to the limited size of SRAM. So here, case A considers that SRAM does not have the required mapping data for any reason, such as that it was released after flushing to NAND (consolidation) or that there was no host write for that mapping. As shown in the example in FIG. 6, the required map is in a different shading in DRAM. If an uncorrectable error is detected while reading the mapping data in DRAM, it can be recovered by reloading the mapping data from the FTL main block to DRAM, as in the approach for HMB recovery.

Figure 9:
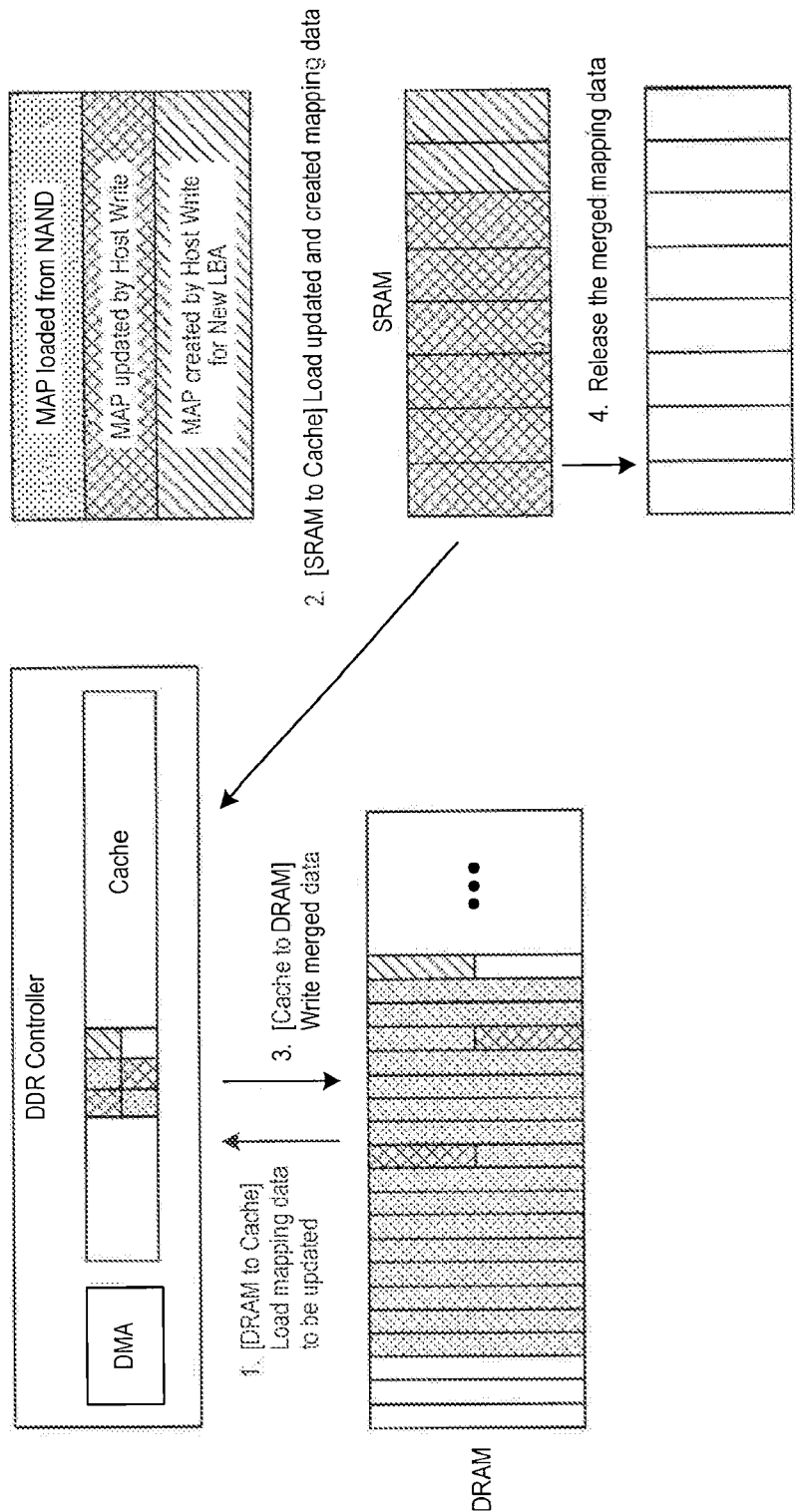
FIG. 9 is a diagram illustrating a merge operation of an embodiment.

If the controller 102 determines if a flush is in progress for consolidation (780), case C is triggered. In case C, mapping data is flushed to the FTL main block as a new FTL main mapping data, referred to as consolidation. Due to the large size of the data to be flushed to the NAND, the new mapping data is prepared in DRAM by a merge operation as depicted in FIG. 9. As shown in FIG. 9, the controller 102 performs the recovery by rebuilding the mapping data from the FTL main block, control block, and open block for user data. The target data to be merged is located in DRAM and SRAM. DRAM has the mapping data that was loaded from the FTL main block, and some of that data was updated by a host write. SRAM has two items of updated data. One was loaded from DRAM and then updated by a host write, and the other was created by a host write for the new logical block address (LBA).

With considering the size of data management in each location, one entry for mapping data in DRAM may include both updated and non-updated data as the different shaded entries in DRAM in FIG. 9 shows. So, data gathering for merge is done by loading the entry including the updated data from DRAM and the new mapping data from SRAM. The last step to merge is to update the DRAM with the gathered data that is loaded from DRAM and SRAM to the cache module in the DDR controller. After the merge operation is completed, the merged main mapping data is flushed to the FTL main mapping block in the NAND. At this moment, the mapping data, which was in SRAM and merged to DRAM, will not be available in SRAM anymore since the relevant SRAM area would be released right after the merge operation. As a result, SRAM cannot be referenced for recovery of the uncorrectable bit-flip during data transfer from DRAM to the NAND.

Figure 10:
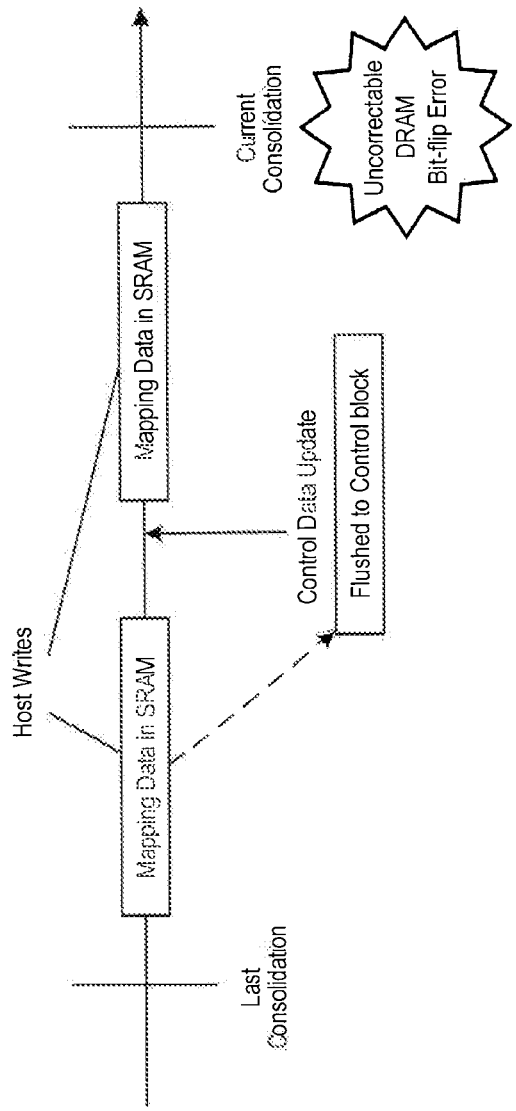
FIG. 10 is a diagram illustrating writes over time of an embodiment.

If the control block was updated after last consolidation, the controller 102 can find the flushed updated mapping data required to recover from the control block instead of SRAM, as shown in FIG. 10. Further, there may be another updated mapping data, which was updated but not flushed to the control block yet, as also shown in FIG. 10. This mapping data was in SRAM and released by the merge operation as a preparation of the current consolidation. In this case, this mapping data can be found from the meta-data area in the open user block. This can require scanning all written pages in the open user block.

Figure 11:
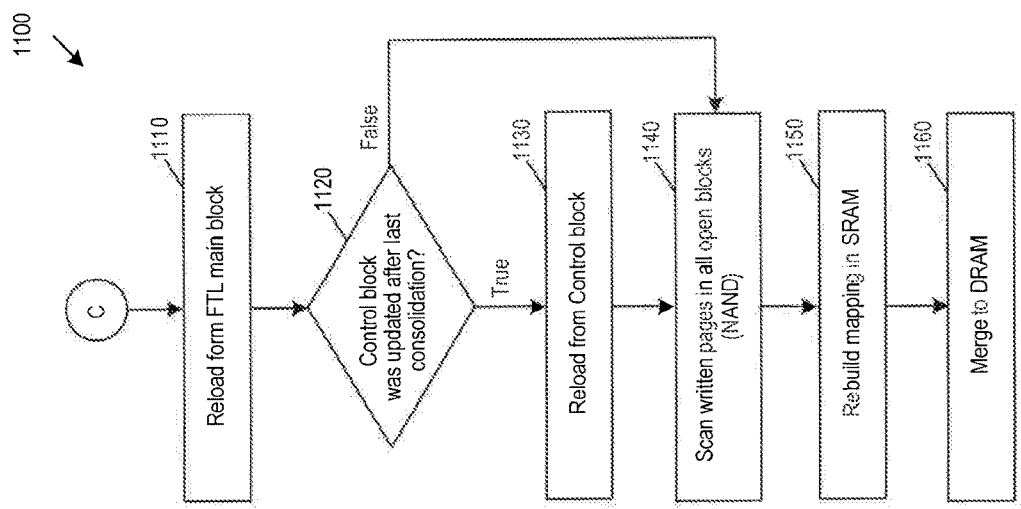
FIG. 11 is a flow chart of a method of an embodiment for rebuilding mapping data.

FIG. 11 shows a flow chart 100 of the entire recovery sequence of case C. As shown in FIG. 11, the controller 102 reloads from the FTL main block (1110) and determines if the control block was updated after the last consolidation (1120). If it was, the controller 102 reloads from the control block (1130). If it was not, the controller 102 scans written pages in all open blocks in the memory 104 (1140). The controller 102 then rebuilds the mapping in SRAM (1150) and merges to the DRAM (1160).

There are several advantages associated with these embodiments. For example, by being able to correct an uncorrectable error in DRAM, these embodiments can recover errors in FTL mapping data, which is important data in the storage system. As a result, higher yield in production can be achieved by avoiding screening out storage systems that have an uncorrectable DRAM error. Further, the number of issues resulting from uncorrectable bit errors that develop in the field can be reduced.

There are many alternatives that can be used with these embodiments. For example, these embodiments can also be applied to HMB recovery in a DRAM-less product. For example, assume that the HMB can have a read-write property like internal DRAM of a DRAM-based product. The primary mapping is in SRAM, and demoted mapping by a predefined replacement policy is in the HMB. When the host issues a write command that has its mapping data in the HMB, the mapping data can be updated instead of invalidated. If there is a bit-flip error in the updated mapping data in the HMB, the data can be recovered by rebuilding from the FTL main block and SRAM (Case B). During consolidation, merged mapping can be in both SRAM and the HMB because the HMB is an extension with a read/write property in this assumption. If an uncorrectable error is detected while saving the merged mapping data in the HMB to the FTL main block, it can be recovered by rebuilding the mapping data from the FTL main block, control block, and open block for user data (case C).

Another alternative relates to an uncorrectable multi-bit error (MBE) recovery method in DRAM that enables predictable data correction based on FTL mapping pattern analysis by looking-up adjacent data near the multi-bit corruption position. As mentioned above, FTL mapping data is populated in DRAM. Whenever a host write is committed to the NAND, the corresponding FTL mapping is updated in DRAM. The storage system may have a data correction module, such as a single error correction double error detection (SECDED) hardware block to protect against data corruption in DRAM. However, when a multi-bit error is detected, the error is not recoverable by the hardware block. So, firmware in the controller can issue a firmware reset or run in a malfunction state.

Figure 12:
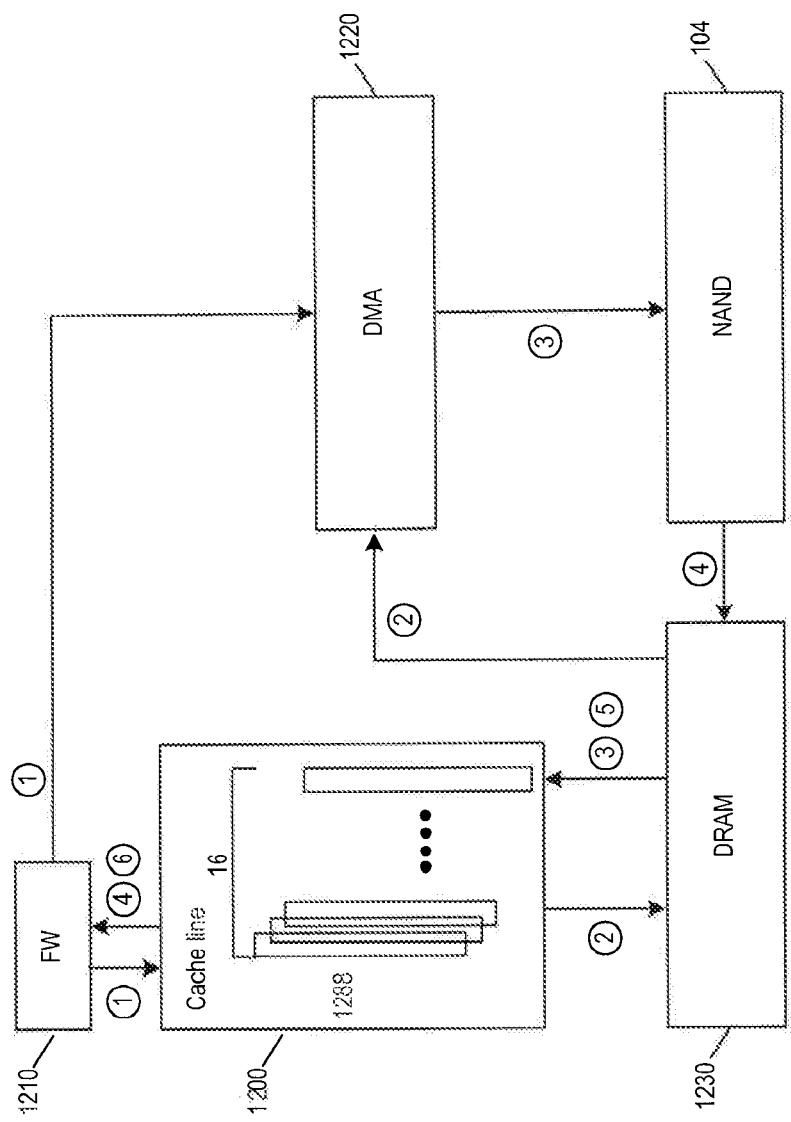
FIG. 12 is a block diagram of a system of an embodiment.

FIG. 12 is a block diagram of a storage system that illustrates this problem. As shown in FIG. 12, in this embodiment, the storage system comprises a cache line 1200, firmware 1210, a direct memory access (DMA) module 1220, DRAM 1230, and NAND 104. For FTL mapping read/write in DRAM 1230, when the FTL requires a particular FTL mapping table to perform read/write user data and the FTL mapping table is already loaded in DRAM 1230, the FTL utilizes the cache line 1200, which is placed between the FTL (firmware 1210) and DRAM 1230 to get/update the FTL mapping table from/to DRAM 1230. In a DMA operation from/to DRAM 1230 to/from NAND 104, to load/store the FTL mapping group in DRAM 1230 from/to NAND 104 for saving (storing) the recent FTL mapping set and provide (load) the required FTL mapping data, the FTL issues a DMA request to initiate a DMA operation by the NAND controller. With these two methods, the FTL mapping data is dynamically read/updated in DRAM 1230, and the latest FTL mapping data is maintained on both DRAM 1230 and the NAND 104.

However, there are limitations of error correction. For example, data written to DRAM can be is protected by using a SECDED operation by the DDR controller during a READ access. For the case of FTL mapping read/write in DRAM, an auto-correction function can be used that is capable of correcting a one-bit error without firmware intervention. Therefore, the FTL always obtains valid FTL mapping data unless a multi-bit error case is occurred. For the case of a DMA operation, when a one-bit error is corrected by firmware manipulation on top of the SECDEC HW block, because of DMA/DRAM access control, once the one-bit error is corrected, DMA transfer is resumed. However, only one bit is corrected by the SECDED hardware block, and the SECDED hardware block cannot correct multi-bit errors. In that case, the relevant interrupt is invoked, and the firmware goes to a fatal assert mode. These operations are shown in the flow chart 1300 in FIG. 13.

Figure 13:
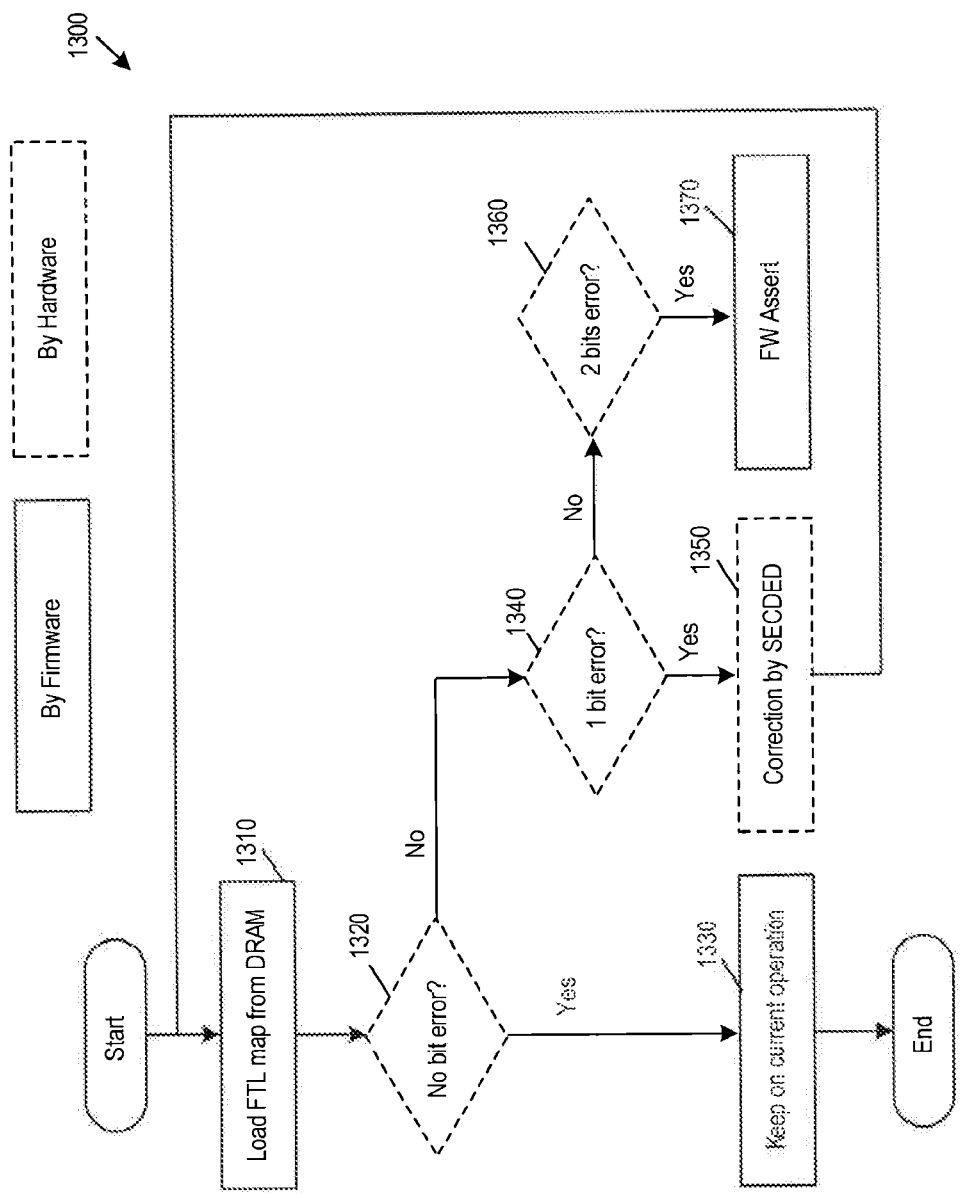
FIG. 13 is a flow chart of an error correction method of an embodiment.

In FIG. 13, some of the acts can be performed by firmware in the controller 102 while other acts can be performed in hardware (e.g., in the controller 102 or elsewhere in the storage system 100). Of course, this is just one example implementation, and other implementations can be used. For simplicity, FIG. 13 will now be discussed in terms of the controller 102 performing the various actions.

As shown in FIG. 13, the controller 102 loads the FTL map from DRAM (1310) and determines if there is a bit error (1320). If there is no bit error, the controller 102 continues with the current operation (1330). However, if there is a bit error, the controller 102 determines if there is only a single-bit error or if there are two bits in error (1340, 1360). If there is only a single-bit error, the controller 102 performs the correction by SECDED (1350). If these are two bits in error, the controller 102 performs a firmware assert (1370).

The below embodiments recognize that since FTL mapping data is recorded as a linear address pattern, if corrupted mapping data is found in DRAM, firmware can recover the corrupted data by referring to adjacent FTL mapping. So, in general, this embodiment detects corrupted FTL mapping data and corrects the corrupted data with predictable FTL mapping data, as a multi-bit error recovery scheme for data in DRAM.

For the practical DRAM multi-bit error situation, three different corruption patterns can be categorized as (1) a general linear FTL mapping pattern (see FIG. 14), (2) an initial FTL mapping pattern (see FIG. 15), and (3) a multi-linear FTL mapping pattern (see FIG. 16). As can be seen from these data patterns, a corrupted data location can be identified. For example, in the general linear FTL mapping pattern, the data pattern (0x16BC0861) at offset 8 marked in box in FIG. 17 is not linear between offset 7's data and offset 9's data.

Basically, the storage system that accesses 128-byte chunks of data and has generated parity of 16-bits over 128 bytes (which is split into 32 FTL mapping elements) has little chance to update one or two non-linear FTL mappings in 128 bytes of FTL mapping data. By leverage this characteristic of FTL mapping pattern, the correct FTL mapping table can be predictable under the linear FTL mapping circumstance shown in FIG. 18 with comparison between "Corrupt−1 position" and "Corrupt+1 position".

Figure 19:
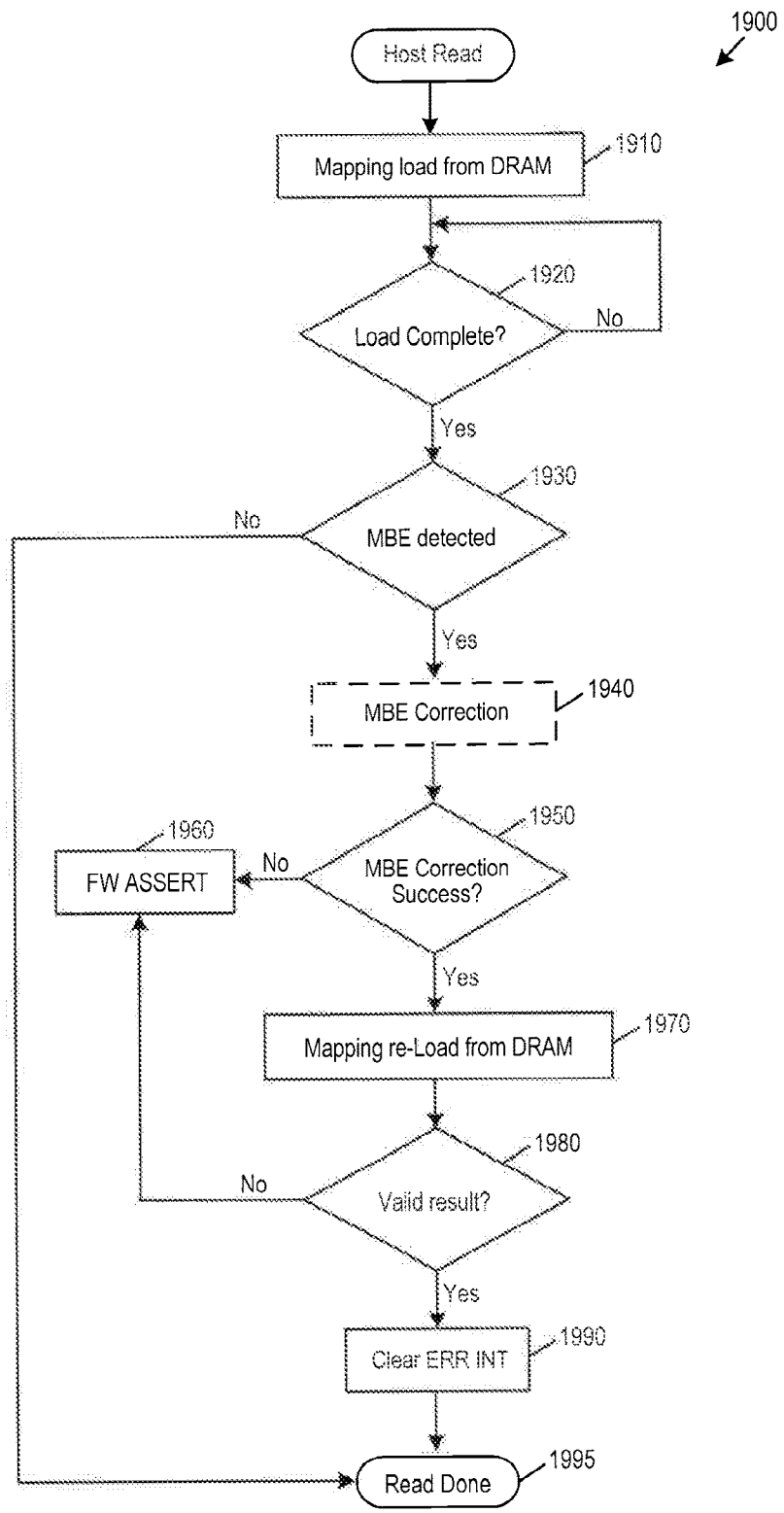
FIG. 19 is a flow chart of a method of an embodiment for linear FTL mapping correction of a multi-bit error in a host read.
Figure 21:
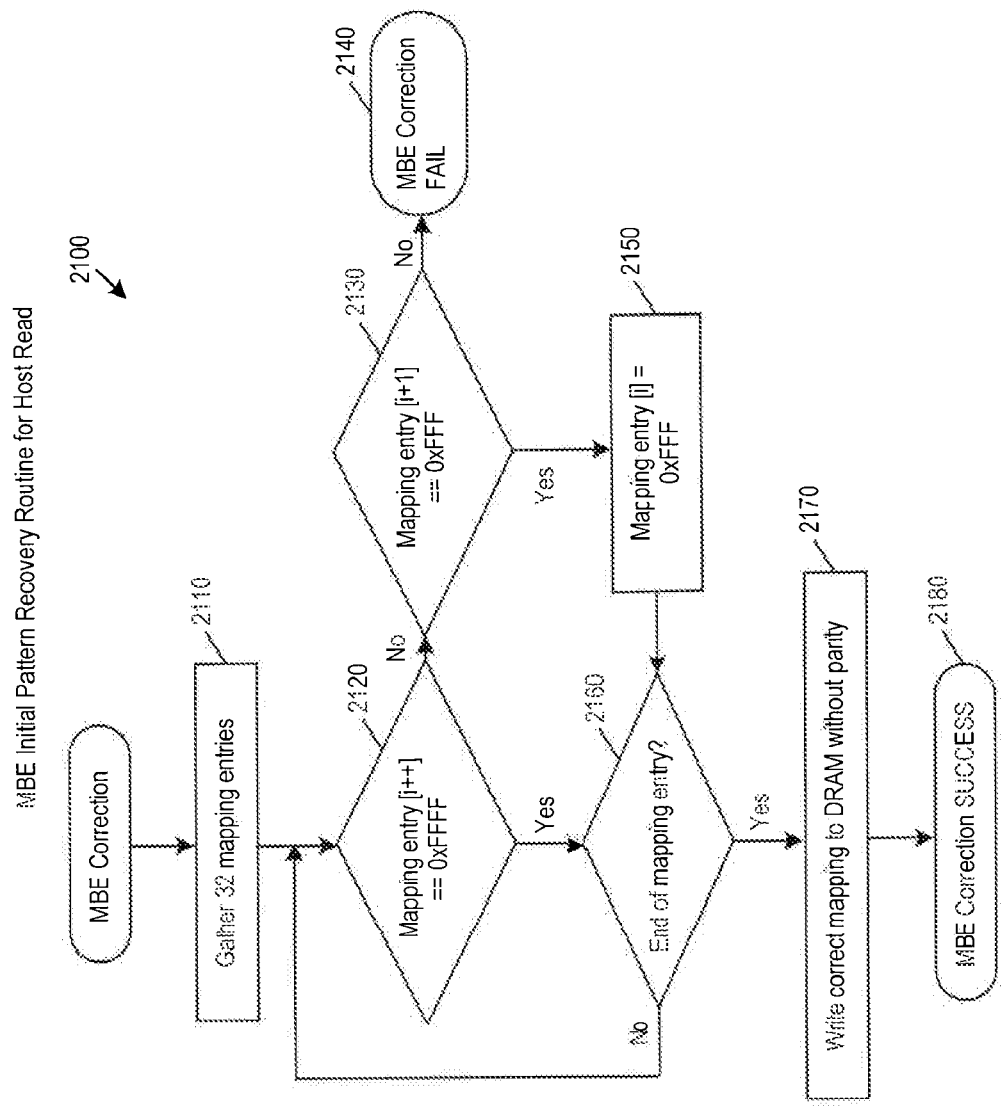
FIG. 21 is a flow chart of a method of an embodiment for initial FTL mapping correction of a multi-bit error in a host read.
Figure 23:
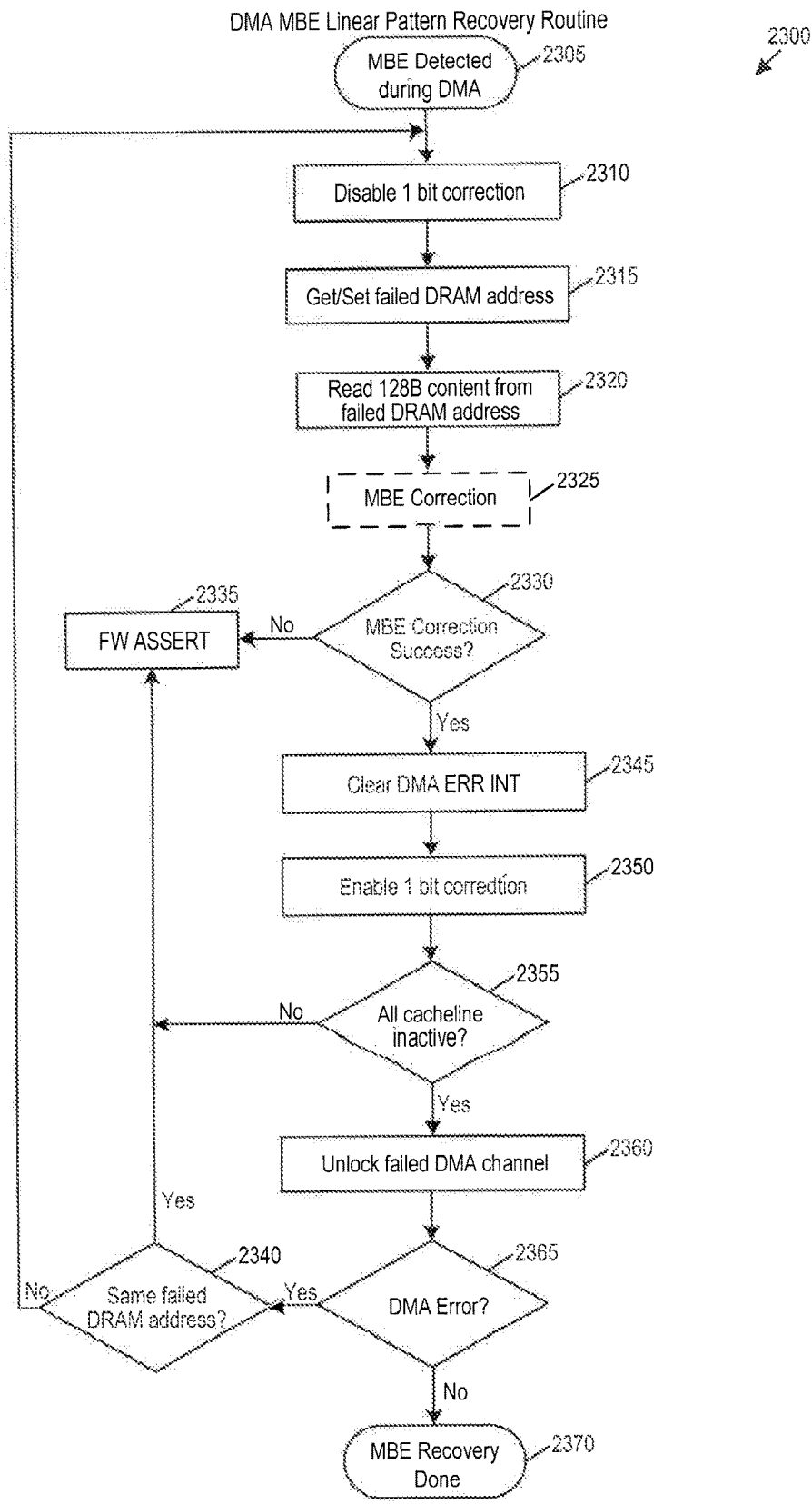
FIG. 23 is a flow chart of a method of an embodiment for linear FTL mapping correction of a multi-bit error in a direct memory access operation.

The FTL mapping table correction algorithm's flow chart 1900 for multi-bit error of cache line is shown in FIG. 19 for a linear FTL mapping table pattern, in FIG. 21 for an initial pattern, and in FIG. 23 for a multi linear pattern. During reading DRAM through the cache line, when a multi-bit error is detected, the firmware gathers 32 FTL mapping entries (128 bytes) from the cache line for multi-bit error correction. It is judged as linear by comparison of offset N data of 32 entries with expected data, assuming a linear FTL mapping pattern. The linear FTL mapping check routine keeps going until the end of 32 entries.

If one of entries is detected as a non-linear FTL mapping at offset M, and offset M+1 data is linear from the expected data at offset M, the firmware writes the expected data to offset M as a recovery sequence. The parity generation function can be turned off when writing corrected data because the original parity value is utilized to check integrity of the corrected 128 bytes of data.

After the multi-bit error correction with the FTL mapping entry correction routine, the cache line is re-loaded for checking the validity of corrected data with the original parity. If it is valid after correction, the firmware can use the corrected FTL mapping data, and the corrected data is updated into DRAM.

Figure 20:
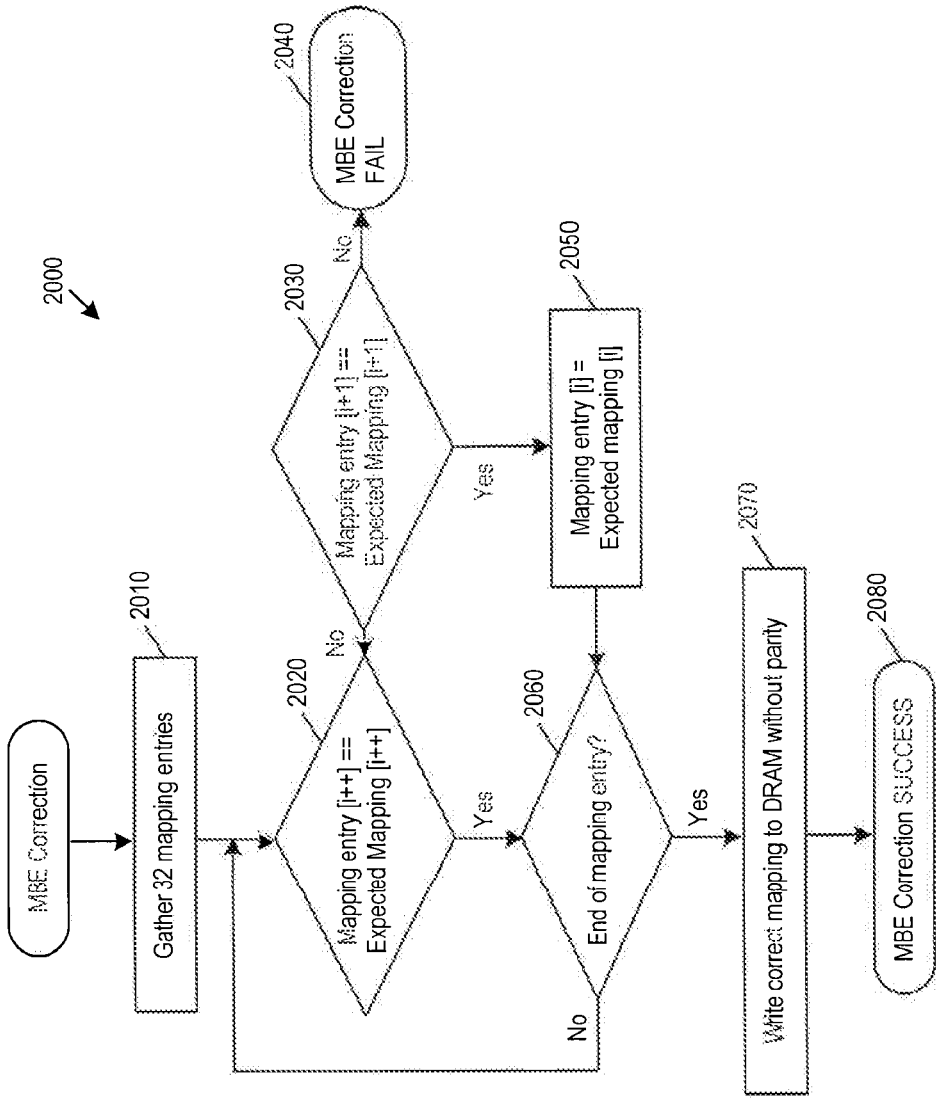
FIG. 20 is a flow chart of a method of an embodiment for linear FTL mapping correction of a multi-bit error in a host read.

This is illustrated in FIGS. 19 and 20. FIG. 19 is a flow chart 1900 of a method of an embodiment for linear FTL mapping correction of a multi-bit error in a host read. As shown in FIG. 19, the controller 102 loads mapping data from the DRAM (1910) and determines if the load is complete (1920). When the load is complete, the controller 102 determines if MBE is detected (1930). If MBE is not detected, the read is done (1995). However, if the MBE is detected, the controller 102 performs an MBE correction step (1940) and then determines if that correction was successful (1950). If the correction was unsuccessful, a firmware assert is performed (1960). If the correction was successful, the mapping data is reloaded from the DRAM (1970). If that reloading provided a valid result, the controller clears the ERR interrupt (1990).

Any suitable operation can be used to perform the MPE correction (1940). One example is shown in FIG. 20. As shown in the flow chart 2000 in FIG. 20, in this operation, the controller 102 gathers 32 mapping entries (2010) and determines if the mapping entry matches an expected entry (2020). If it does and the end of the mapping entry is present (2060), the controller 102 writes the correct mapping to DRAM without parity (2070) and signals an MBE correction success (2080). However, if the entries do not match, the controller 102 determines if different entries match (2030). If they do not, the MBE correction failed (2040). If they do, a new association is made (2050).

For initial pattern correction shown in FIG. 19, if one of the entries is detected as non-initial FTL mapping at offset M and offset M+1 data is the initial pattern from the expected data at offset M, the firmware writes the expected data to offset M as a recovery sequence the same as linear. After correction, the cache line re-loaded from DRAM to check if it is valid. If it is not valid, the firmware issues FATAL_ASSERT since it is not rightly corrected. This is illustrated in the flow chart 2100 in FIG. 21.

As shown in FIG. 21, the controller 102 gathers 32 mapping entries (2110) and determines if each mapping entry matches an expected entry (2120). If it does and the end of the mapping entry is present (2160), the controller 102 writes the correct mapping to DRAM without parity (2170) and signals an MBE correction success (2180). However, if the entries do not match, the controller 102 determines if different entries match (2130). If they do not, the MBE correction failed (2140). If they do, a new association is made (2150).

For multi-linear pattern correction, it can also be detected and corrected when the multi-linear patterns exist in 128 bytes. For example, if one of entries is detected as non-linear FTL mapping at offset N+1 in the first linear pattern, and offset N+2 data is linear from the expected data at offset N, the firmware can write the first linear expected data to offset N+1 as a recovery sequence. The next linear pattern recovery method is the same as the first linear recovery method. After MBE correction, if it is not valid with reloading the cache line from DRAM, the firmware can issue a FATAL_ASSERT for showing not correctly recovery.

Figure 22:
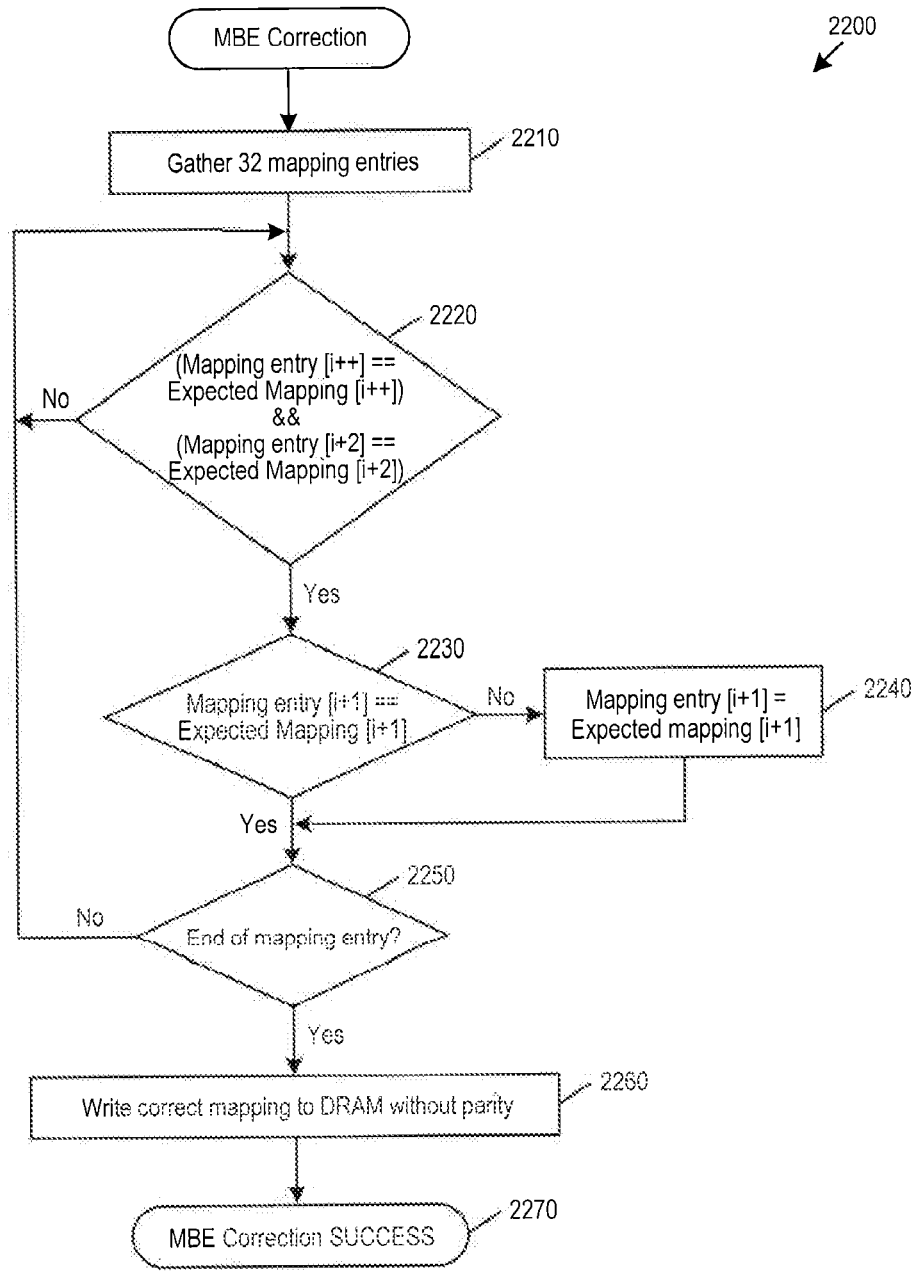
FIG. 22 is a flow chart of a method of an embodiment for multi-linear FTL mapping correction of a multi-bit error in a host read.

This is illustrated in the flow chart 2200 in FIG. 22. As shown in FIG. 22, the controller 102 gathers 32 mapping entries (2210) and determines if each mapping entry matches an expected entry (2220). If it does not, the controller 102 loops back to 2020. If it does, the controller 102 determines if the mapping entry matches another expected entry (2230). If it does and the end of the mapping entry is present (2250), the controller 102 writes the correct mapping to DRAM without parity (2260) and signals an MBE correction success (2270). However, if it does not, the controller 102 sets a different association (2240).

For DMA, the existing firmware routine is leveraged to correct corrupted FTL mapping data. Multi-bit error correction flow is similar to the cache line one for all three patterns. There are different DMA block recovery sequences and recovery ranges by each 128 byte block for 32 KB of data, which is the transfer size by the DMA descriptor at one time. When a multi-bit error is detected, the DMA module can be disabled for one-bit correction to prevent the interrupt of another one-bit correction. Then, the MBE correction flow can be followed by Clearing DMA ERR INT. Next, the one-bit correction function can be enabled for the next one-bit correction. The firmware can issue FATAL_ASSERT if the cache lines are not stable after recovery. However, if a DMA error arises on a different failed DRAM address, it means that there is another corrupted data situation in 128 bytes, so the recovery routine should be run again. Finally, the routine can be repeatedly performed for each 128 bytes for 32 K of data, which is the FTL write size in this example, with the above flows.

The following paragraphs describe the DMA recovery flows for linear FTL mapping table patterns, initial patterns, and multi-linear patterns. FIG. 23 is a flow chart 2300 of a method of an embodiment for linear FTL mapping correction of a multi-bit error in a direct memory access (DMA) operation. As shown in FIG. 23, the controller 102 detects MBE during a DMA operation (2305). The controller 102 then disables one-bit correction (2310) and gets/sets the failed DRAM address (2315). Next, the controller 102 reads 128 byte content from the failed DRAM address (2320) and performs MBE correction (2325). The controller 102 then determines if the MBE correction was successful (2330). If it was not successful, a firmware assert is performed (2335). If it was successful, the controller 102 clears the DMA error interrupt (2345) and enables one-bit correction (2350). The controller 102 then determines if all cache lines are inactive (2355). If all cache lines are not inactive, a firmware assert is performed (2335). If all cache lines are inactive, the controller 102 unlocks the failed DMA channel (2360) and determines if there is a DMA error (2365). If there is no DMA error, the MBE recovery processes is done (2370).

However, if there is a DMA error, the controller 102 determines if the error occurred on the same failed address (2340). If it did not, the method is repeated at 2310. If it did, a firmware assert is performed (2335).

Any suitable operation can be used to perform the MPE correction (2325). Examples of such operations are provided in FIGS. 24-26. It should be noted that these are merely examples, and other types of operations can be used.

Figure 24:
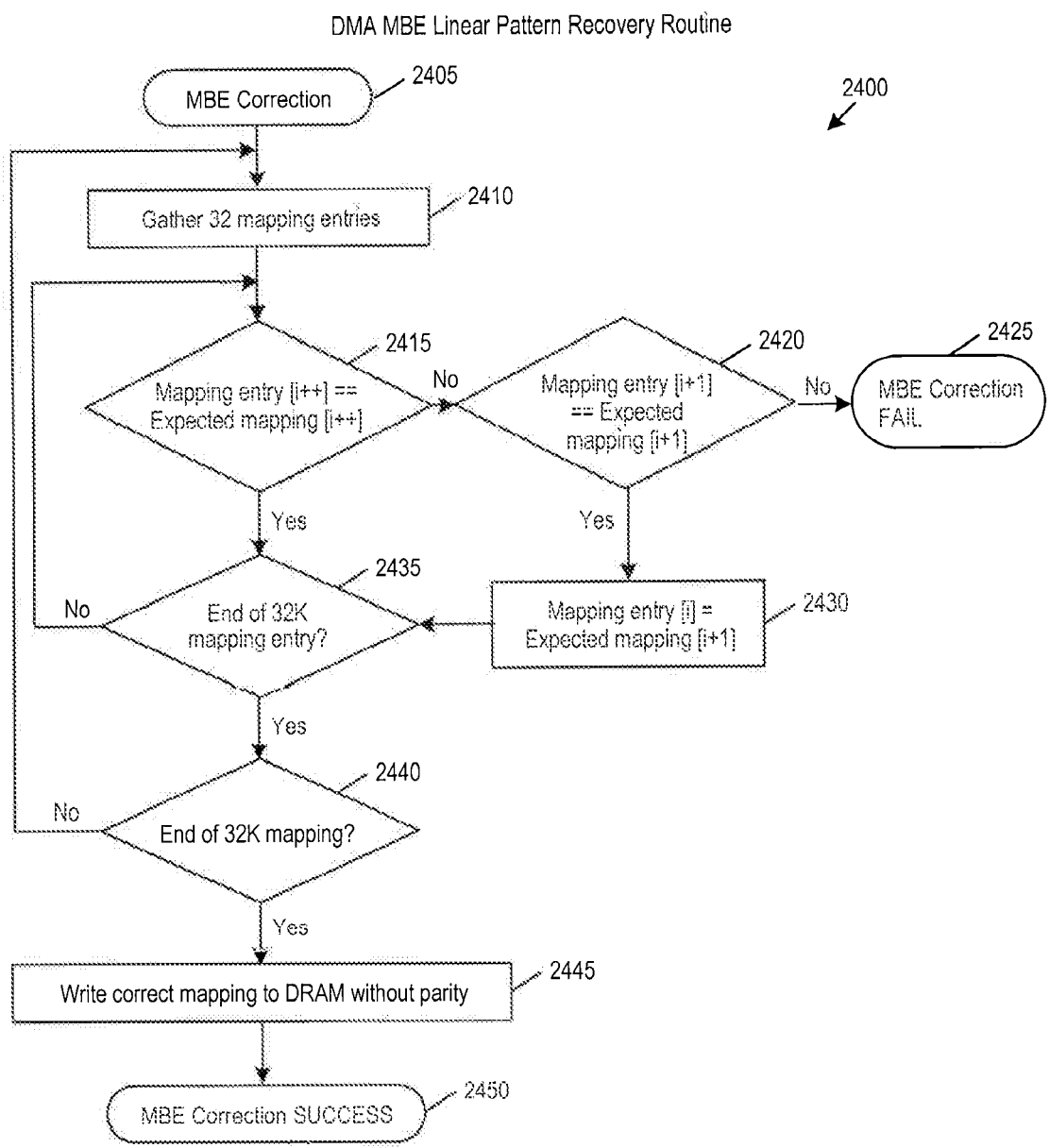
FIG. 24 is a flow chart of a method of an embodiment for linear FTL mapping correction of a multi-bit error in a direct memory access operation.

Turning first to FIG. 24, as shown in the flow chart 2400 in FIG. 24, in this operation, the controller 102 gathers 32 mapping entries (2410) and determines if the each mapping entry matches a certain value (2415, 2435, 2440). If they do, the controller 102 writes the correct mapping to the DRAM without parity (2445) and indicates that the MBE correction was a success (2450). However, if there is not a match, the controller determines if the entry matches a different value (2420). If it does not, the controller 102 indicates an MBE correction fail 2425). If it does, the entry is set to a different value (2430).

Figure 25:
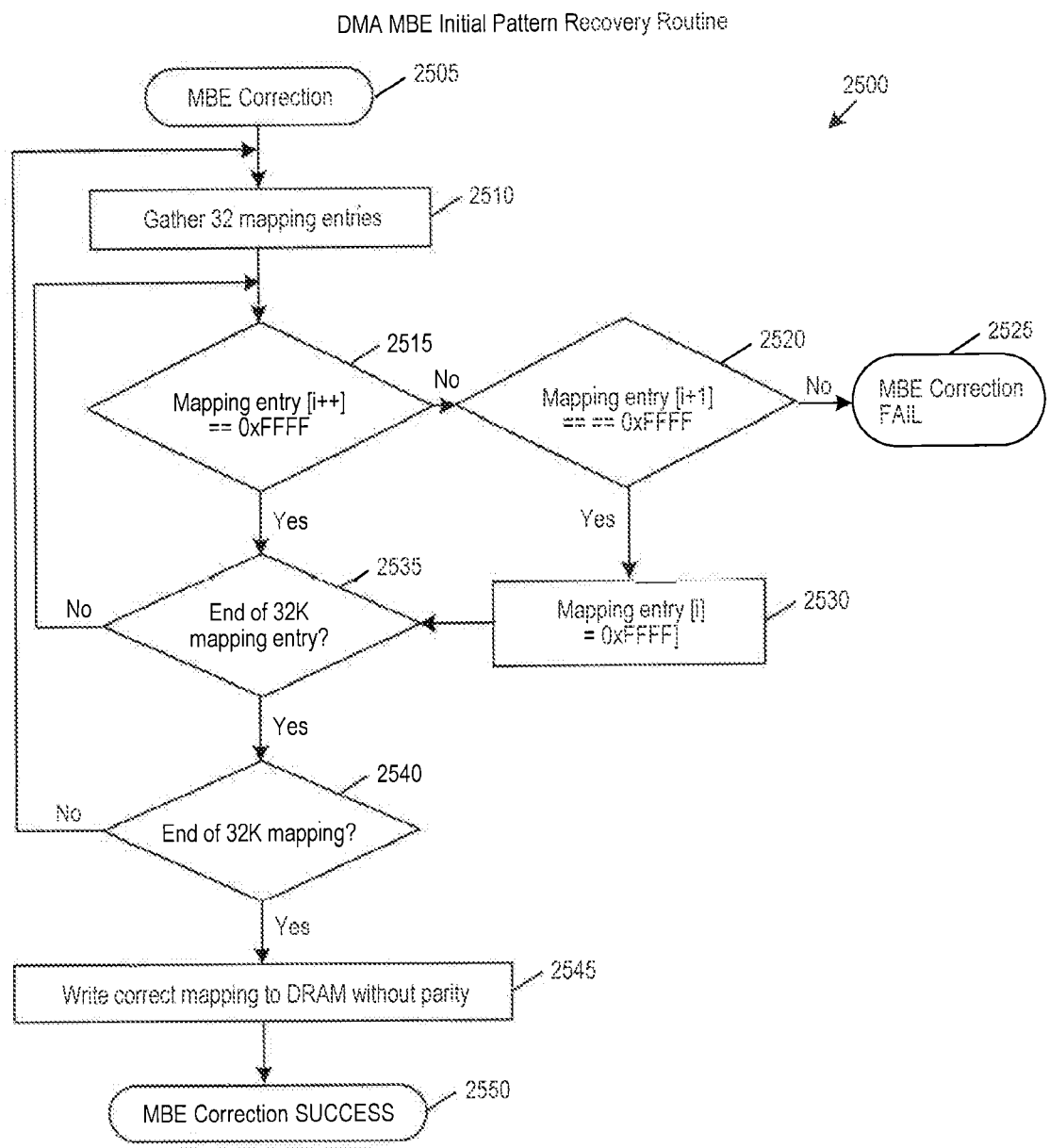
FIG. 25 is a flow chart of a method of an embodiment for initial FTL mapping correction of a multi-bit error in a direct memory access operation.

In the second example operation shown in the flow chart 2500 in FIG. 25, the controller 102 gathers 32 mapping entries (2410) and determines if the each mapping entry matches a certain value (2515, 2535, 2540). If they do, the controller 102 writes the correct mapping to the DRAM without parity (2545) and indicates that the MBE correction was a success (2550). However, if there is not a match, the controller determines if the entry matches a different value (2520). If it does not, the controller 102 indicates an MBE correction fail (2525). If it does, the entry is set to a different value (2530).

Figure 26:
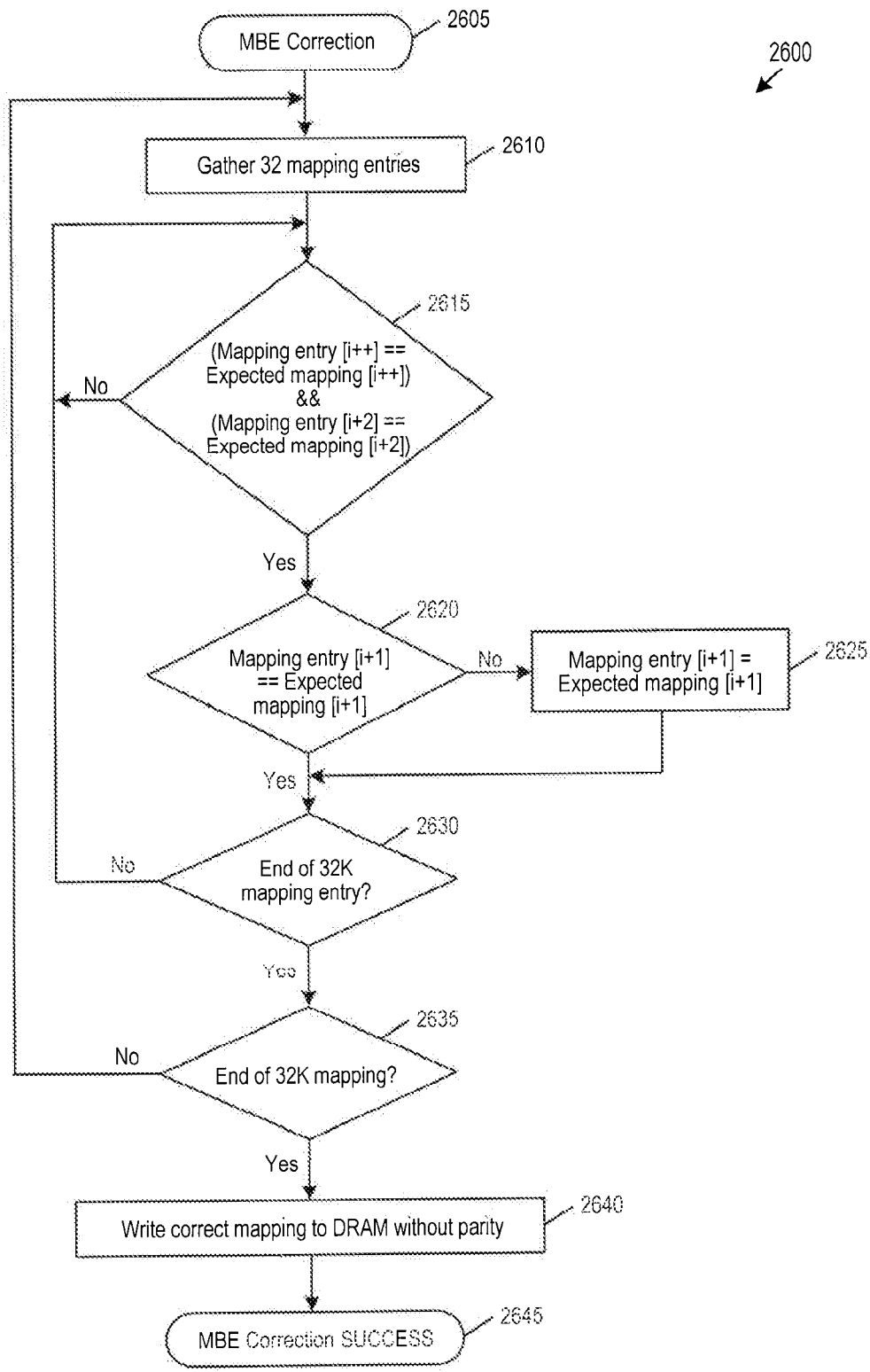
FIG. 26 is a flow chart of a method of an embodiment for multi-linear FTL mapping correction of a multi-bit error in a direct memory access operation.

In the third example operation shown in the flow chart 2600 in FIG. 26, the controller 102 gathers 32 mapping entries (2610) and determines if the each mapping entry matches a certain value (2615, 2620, 2630, 2635). If they do, the controller 102 writes the correct mapping to the DRAM without parity (2640) and indicates that the MBE correction was a success (2645). However, if there is not a match, the controller determines if the entry matches a different value (2625).

There are several advantages associated with these embodiments. For example, these embodiments can be used to cover many DRAM multi-bit errors in the field and can be applied to HMB (external DRAM) used in DRAM-less products and future DRAM-based products. Additionally, these embodiments can be reflected in SRAM-loaded FTL mapping data corruption. In case of using SRAM for FTL mapping data, the identical linear correction can be applied to recover corrupted SRAM for FTL mapping data. Also, before setting ASSERT, the firmware can save the registers accessed by the DDR controller, so the detailed status of the DDR interface can be seen at the failure moment. These embodiments can help moderate transient DRAM multiple bit-flips issues and reduce defect on-field or at the production level, which can provide cost savings.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A storage system comprising:
a non-volatile memory; and
a controller coupled to the non-volatile memory and configured to:
read logical-to-physical address mapping data from the non-volatile memory, wherein the logical-to-physical address mapping data comprises an existing entry that translates a logical address to a physical address;
write the logical-to-physical address mapping data read from the non-volatile memory in a first volatile memory;
receive a write command to write data to the logical address;
generate a new entry for the logical-to-physical address mapping data that translates the logical address to a new physical address;
write the new entry in a second volatile memory;
update the logical-to-physical address mapping data written in the first volatile memory by reading the new entry from the second volatile memory and replacing the existing entry in the logical-to-physical address mapping data written in the first volatile memory with the new entry;
determine whether an uncorrectable error exists in the updated logical-to-physical address mapping data written in the first volatile memory; and
in response to determining that the uncorrectable error exists in the updated logical-to-physical address mapping data written in the first volatile memory:
recreate the updated logical-to-physical address mapping data in the first volatile memory by:
reading the logical-to-physical address mapping data from the non-volatile memory;
reading the new entry from the second volatile memory; and
merging the new entry into the logical-to-physical address mapping data read from the non-volatile memory; and
store the recreated logical-to-physical address mapping data in the first volatile memory.

2. The storage system of claim 1, wherein the controller is further configured to determine whether there is a flush in progress for consolidation.

3. The storage system of claim 1, wherein the controller is further configured to perform the following in response to determining that a control block was updated after a last consolidation:
re-load data from the control block;
scan written pages in open blocks in the non-volatile memory;
rebuild the data in the second volatile memory; and
merge the rebuilt data into the first volatile memory.

4. The storage system of claim 1, wherein the first and second volatile memories are both in the storage system.

5. The storage system of claim 1, wherein the first volatile memory is in a host memory buffer and the second volatile memory is in the storage system.

6. The storage system of claim 1, wherein the first volatile memory comprises dynamic random access memory and the second volatile memory comprises static random access memory.

7. The storage system of claim 1, wherein the non-volatile memory comprises a three-dimensional memory.

8. The storage system of claim 1, wherein the controller is further configured to:

analyze a pattern in data adjacent to the uncorrectable error;
predict corrected data based on the pattern; and
store the predicted corrected data in the first volatile memory.

9. The storage system of claim 8, wherein the pattern comprises a general linear pattern.

10. The storage system of claim 8, wherein the pattern comprises an initial pattern.

11. The storage system of claim 8, wherein the pattern comprises a multi-linear pattern.

12. In a storage system comprising a non-volatile memory, a method comprising:
reading logical-to-physical address mapping data from the non-volatile memory, wherein the logical-to-physical address mapping data comprises an existing entry that translates a logical address to a physical address;
writing the logical-to-physical address mapping data read from the non-volatile memory in a first volatile memory;
receiving a write command to write data to the logical address;
generating a new entry for the logical-to-physical address mapping data that translates the logical address to a new physical address;
writing the new entry in a second volatile memory;
updating the logical-to-physical address mapping data written in the first volatile memory by reading the new entry from the second volatile memory and replacing the existing entry in the logical-to-physical address mapping data written in the first volatile memory with the new entry;
determining whether an uncorrectable error exists in the updated logical-to-physical address mapping data written in the first volatile memory; and
in response to determining that the uncorrectable error exists in the updated logical-to-physical address mapping data written in the first volatile memory:
recreating the updated logical-to-physical address mapping data in the first volatile memory by:
reading the logical-to-physical address mapping data from the non-volatile memory;
reading the new entry from the second volatile memory; and
merging the new entry into the logical-to-physical address mapping data read from the non-volatile memory; and
storing the recreated logical-to-physical address mapping data in the first volatile memory.

13. The method of claim 12, further comprising:
analyzing a pattern in data adjacent to the uncorrectable error;
predicting corrected data based on the pattern; and
storing the predicted corrected data in the first volatile memory.

14. The method of claim 13, wherein the pattern comprises a general linear pattern.

15. The method of claim 13, wherein the pattern comprises an initial pattern.

16. The method of claim 13, wherein the pattern comprises a multi-linear pattern.

17. The method of claim 12, wherein the volatile memory is in the storage system.

18. The method of claim 12, wherein the volatile memory is in a host memory buffer.

19. The method of claim 12, wherein the volatile memory comprises dynamic random access memory.

20. A storage system comprising:
a non-volatile memory;
means for reading logical-to-physical address mapping data from the non-volatile memory, wherein the logical-to-physical address mapping data comprises an existing entry that translates a logical address to a physical address;
means for writing the logical-to-physical address mapping data read from the non-volatile memory in a first volatile memory;
means for receiving a write command to write data to the logical address;
means for generating a new entry for the logical-to-physical address mapping data that translates the logical address to a new physical address;
means for writing the new entry in a second volatile memory;
means for updating the logical-to-physical address mapping data written in the first volatile memory by reading the new entry from the second volatile memory and replacing the existing entry in the logical-to-physical address mapping data written in the first volatile memory with the new entry;
means for determining whether an uncorrectable error exists in the updated logical-to physical address mapping data written in the first volatile memory; and
means for, in response to determining that the uncorrectable error exists in the updated logical-to-physical address mapping data written in the first volatile memory:
recreating the updated logical-to-physical address mapping data in the first volatile memory by:
reading the logical-to-physical address mapping data from the non-volatile memory;
reading the new entry from the second volatile memory; and
merging the new entry into the logical-to-physical address mapping data read from the non-volatile memory; and
storing the recreated logical-to-physical address mapping data in the first volatile memory.

* * * * *